(12) United States Patent
Tsao

(10) Patent No.: US 7,692,605 B2
(45) Date of Patent: Apr. 6, 2010

(54) ERROR CORRECTION SCHEMES FOR VOLUMETRIC 3D DISPLAYS

(76) Inventor: Che-Chih Tsao, 16 Walnut St., suite 43, Arlington, MA (US) 02476

( * ) Notice: Subject to any disclaimer, the term of this patent is extended or adjusted under 35 U.S.C. 154(b) by 853 days.

(21) Appl. No.: 11/156,792

(22) Filed: Jun. 20, 2005

(65) Prior Publication Data

US 2005/0280605 A1    Dec. 22, 2005

Related U.S. Application Data

(60) Provisional application No. 60/581,422, filed on Jun. 21, 2004.

(51) Int. Cl.
*G09G 5/00* (2006.01)
(52) U.S. Cl. .............................. 345/6; 353/7
(58) Field of Classification Search ........... 345/84–111, 345/204; 348/51; 359/443
See application file for complete search history.

(56) References Cited

U.S. PATENT DOCUMENTS

| | | | | |
|---|---|---|---|---|
| 5,148,310 | A | | 9/1992 | Batchko ..................... 359/479 |
| 5,537,251 | A | | 7/1996 | Shimada ..................... 359/462 |
| 5,655,161 | A | * | 8/1997 | Takagi ......................... 396/271 |
| 5,742,331 | A | * | 4/1998 | Uomori et al. ................ 348/51 |
| 5,754,147 | A | | 5/1998 | Tsao et al. ..................... 345/6 |
| 5,954,414 | A | * | 9/1999 | Tsao ............................. 353/7 |
| 6,157,747 | A | * | 12/2000 | Szeliski et al. .............. 382/284 |
| 6,183,088 | B1 | * | 2/2001 | LoRe et al. .................... 353/7 |
| 6,302,542 | B1 | * | 10/2001 | Tsao ............................. 353/7 |
| 6,554,430 | B2 | | 4/2003 | Dorval et al. .................. 353/7 |
| 6,765,566 | B1 | * | 7/2004 | Tsao ........................... 345/419 |
| 6,900,779 | B1 | * | 5/2005 | Geng ........................... 345/30 |

OTHER PUBLICATIONS

Aviation Week, "New Display Gives Realistic 3-D Effect", Aviation Week, Oct. 31, 1960.
Ito, M. *Dictionary of Mechanisms*, original in Japanese, translated in to Chinese by W. Tang, Chuan-Hua Technology Pub., Taipei, 1986, p. 29.

* cited by examiner

*Primary Examiner*—Amare Mengistu
*Assistant Examiner*—Vinh T Lam

(57) ABSTRACT

This invention describes methods and systems for correcting frame position error on one category of volumetric 3D displays that generates volumetric 3D images by using a rotary mechanism to move a screen to sweep a volume and projecting 2D profile images on the screen. The screen motion is in general rotating or reciprocating and a mechanism of rotational nature is generally applied to drive the motion. The method has three major steps. The first step provides a measure of the frame position error with respect to the theoretical position. The error is a periodical function of the angular position of the moving screen, due to the nature of the mechanisms. The second step constructs a correction function that shifts the position of frame image of each frame with respect to the frame center to compensate the error. The error measurement and the construction of the correction function can be performed statically or dynamically. The third step shifts the image frames to be displayed according to the correction function and projects them in the volumetric 3D display. This invention also includes preferred driving mechanisms that match the periodical nature of the error function.

18 Claims, 12 Drawing Sheets

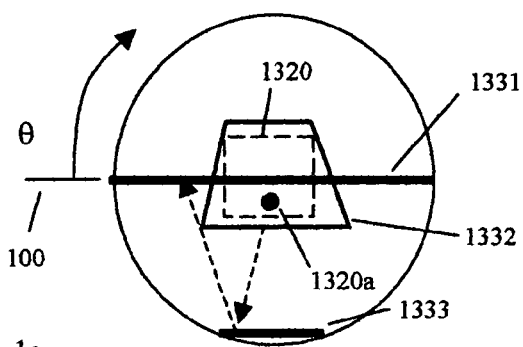
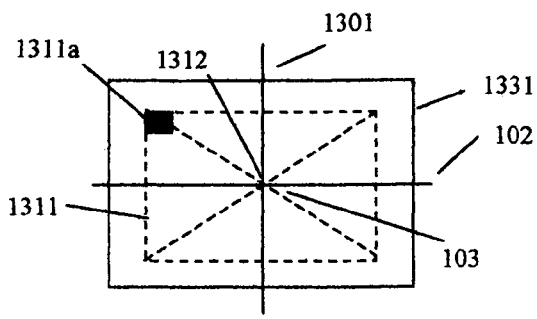
Fig. 1a  Fig. 1b
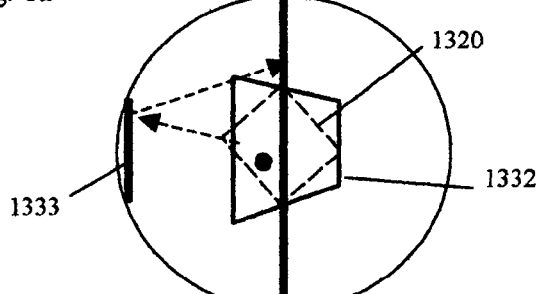
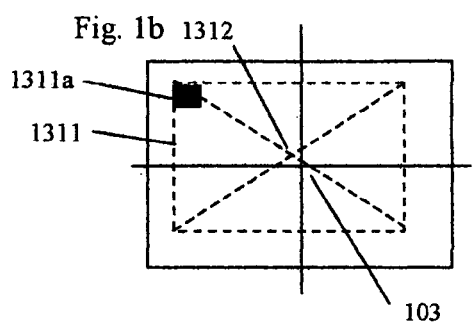
Fig. 2a  Fig. 2b
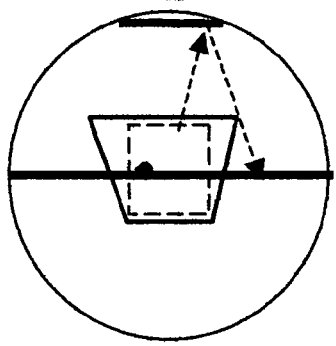
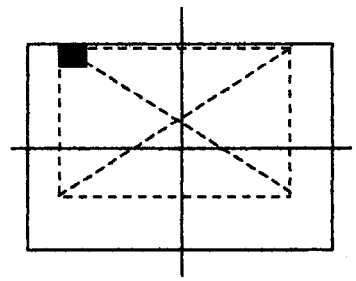
Fig. 3a  Fig. 3b
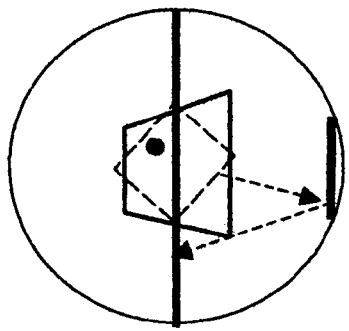
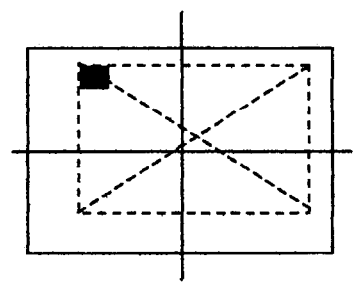
Fig. 4a  Fig. 4b
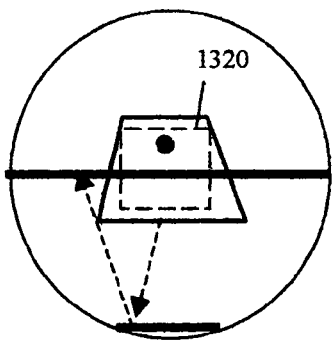
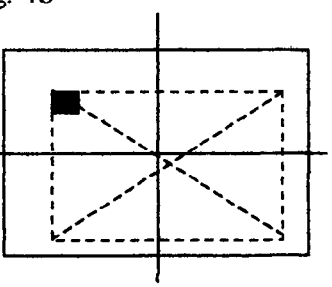
Fig. 5a  Fig. 5b

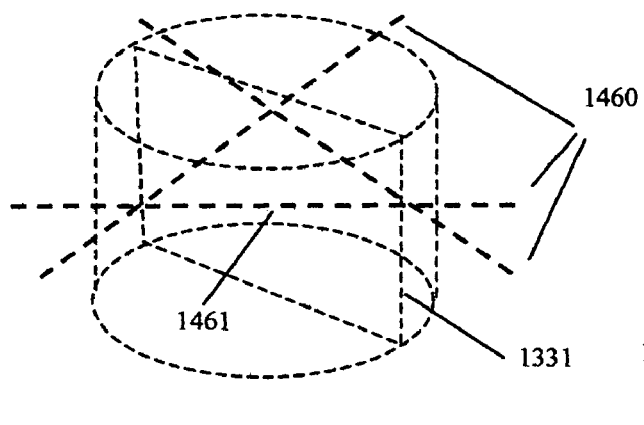
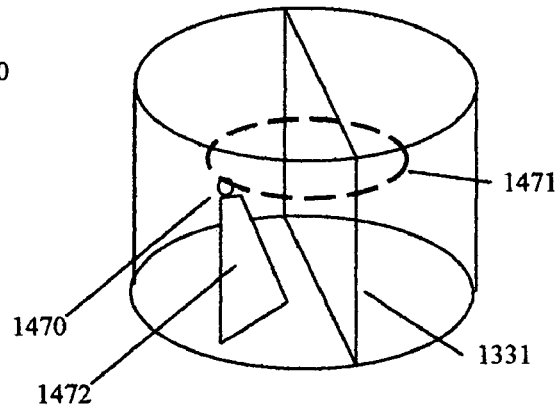
Fig. 14 a            Fig. 14 b
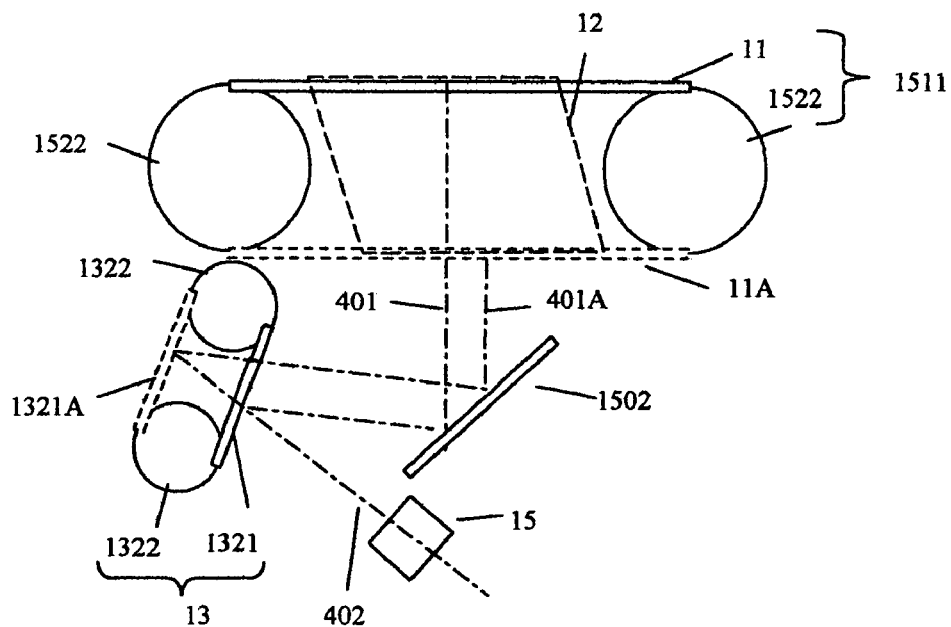
Fig. 15 (prior art)

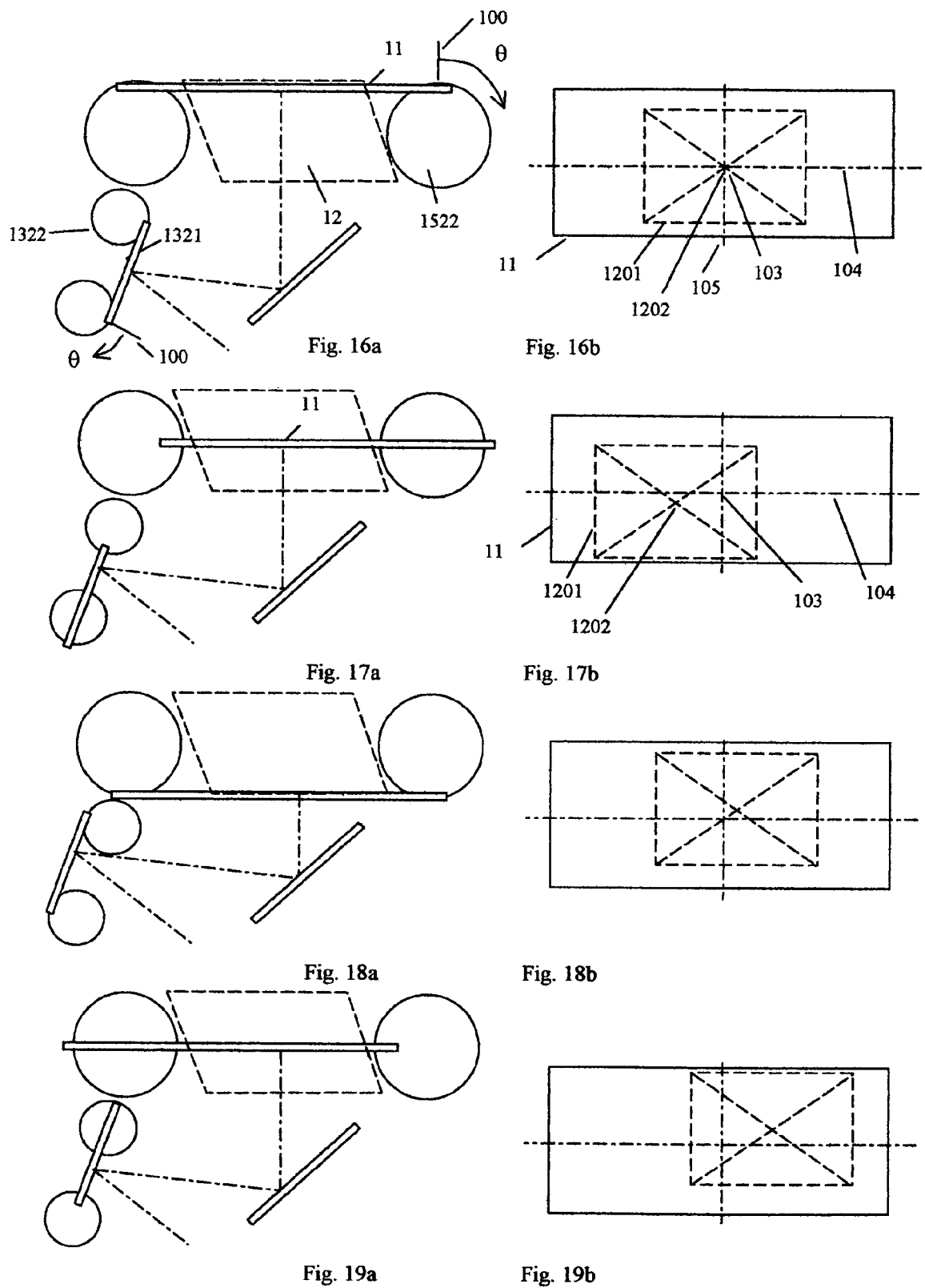

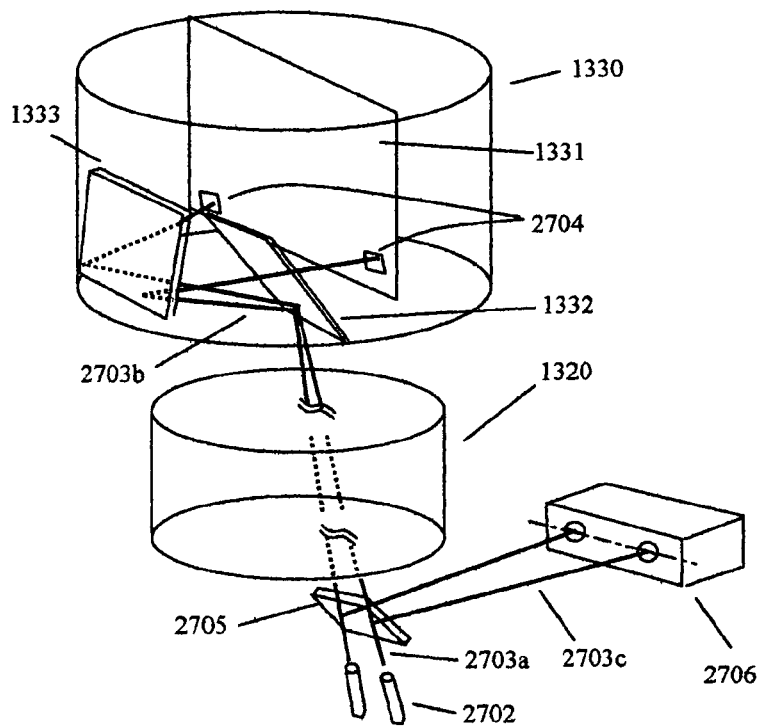
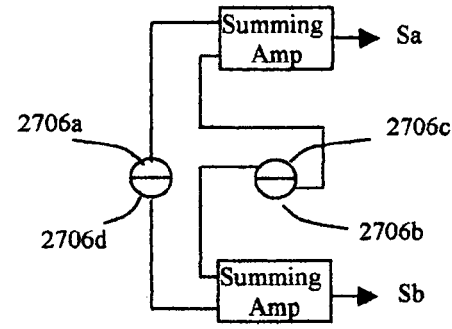
Fig. 27b
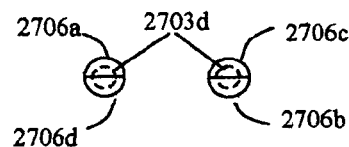
Fig. 27c
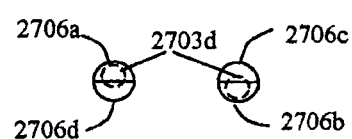
Fig. 27d
Fig. 27a
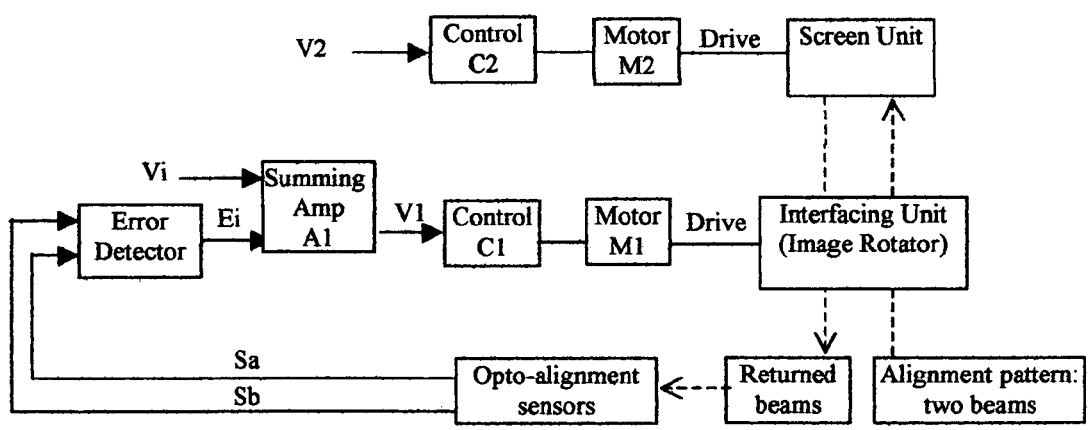
Fig. 27e

ERROR CORRECTION SCHEMES FOR VOLUMETRIC 3D DISPLAYS

This application claims the benefit of prior U.S. provisional application No. 60/581,422, filed Jun. 21, 2004, the contents of which are incorporated herein by reference.

This invention relates to Tsao U.S. patent application Ser. No. 09/882,826, filed Jun. 16, 2001, which has been allowed. This invention also relates to the following co-pending U.S. provisional application by Tsao: No. 60/589,108 filed Jul. 19, 2004, No. 60/589,626 filed Jul. 21, 2004, and No. 60/591,128 filed Jul. 26, 2004.

This invention also relates to the following U.S. patents: Tsao et al., U.S. Pat. No. 5,754,147, 1998; Tsao, U.S. Pat. No. 5,954,414, 1999; Tsao, U.S. Pat. No. 6,302,542 B1, 2001; and Tsao, U.S. Pat. No. 6,765,566 B1, 2004.

This invention further relates to the following US Disclosure Documents:

1. Tsao, "Software Correction Scheme to Image Position Error for VID", U.S. Disclosure Document No. 458009, 1999 (has been requested for extended retaining in PTO)

2. Tsao, "Position Error Correction Schemes for Volumetric 3D Display based on revolving screen, with or without an optical rotator as the interfacing unit", U.S. Disclosure Document No. 514212, 2002.

The above mentioned patents, pending applications and disclosure documents are therefore incorporated herein for this invention by reference.

STATEMENT REGARDING FEDERALLY SPONSORED R&D

Not Applicable

REFERENCE TO COMPACT DISK APPENDIX

Not Applicable

BACKGROUND OF THE INVENTION

This invention relates in general to the field of three-dimensional (3D) volumetric display. More specifically, it relates to correcting image position error for volumetric 3D displays based on moving screen with a rotary mechanism.

One category of volumetric 3D (V3D) displays generates V3D images by moving a screen to sweep a volume and projecting 2D profile images on the screen. V3D images thus form in the swept volume by after-mage effect. The screen motion can in general be rotating or reciprocating. A mechanism of rotational nature is generally applied to drive the motion.

For rotating screen approaches, the screen generally rotates about an axis parallel to and passing through the screen surface. Tsao U.S. Pat. No. 6,765,566 B1, which is incorporated herein by reference, describes an example. FIG. 13 illustrates a V3D display based on a rotating screen with an optical interfacing unit. It has three major portions: a rotating screen unit 1330; a high frame rate image projection system 1310; and a optical interfacing mechanism 1320, which relays the optical image projected from the image projector onto the screen for displaying, while keeping the size, orientation and focus of the projected image invariant as the screen rotates. The preferred optical interfacing mechanism is an optical image rotator rotating at half the speed of the screen. FIG. 12 illustrates an example of an optical rotator as the optical interfacing unit. The screen unit comprises a screen 1331, a central reflector 1332 and a side reflector 1333, which all rotate in unison about a common axis 1301. The projection path is from the projector 1310 to the interfacing unit 1320, then to the central reflector and then to the side reflector and then to the screen. Additional descriptions of this type of V3D display can found in Tsao et al., U.S. Pat. No. 5,754,147, 1998; Tsao, U.S. Pat. No. 5,954,414, 1999 and Tsao, U.S. Pat. No. 6,302,542 B1, 2001, which are incorporated herein by reference.

Another type of rotating screen systems does not have an optical interfacing unit rotating at ½ screen speed. Examples of this type can be found in:

1. Aviation Week, "New Display Gives Realistic 3-D Effect", Aviation Week, Oct. 31, 1960

2. Batchko, R. G. "Rotating Flat Screen Fully Addressable Volume Display System", U.S. Pat. No. 5,148,310, 1992

3. Shimada, S. "Rotating Screen Picture Display Apparatus", U.S. Pat. No. 5,537,251, 1996

4. R. K. Dorval et. al., "Volumetric Three-Dimensional Display System", U.S. Pat. No. 6,554,430, 2003

The above documents are incorporated herein for this invention by reference. In general, this type of systems is similar to that of FIG. 13 except that the interfacing unit 1320 does not exist and the projector projects to the central reflector directly. Without the interfacing unit, the projected image frame thus rotates with respect to the screen surface as the screen rotates.

For reciprocating screen approaches, Tsao U.S. Pat. No. 6,765,566 B1 describes a system with a screen that reciprocates by a rotary motion. (See FIG. 20 of the referred patent) In principle, the screen revolves about an axis while keeping its surface always facing a fixed direction, and the screen sweeps through space and defines a display volume. For convenience, this is called "Rotary Reciprocating mechanism". In Tsao U.S. Pat. No. 6,302,542, a volumetric 3D display with a Rotary Reciprocating screen and a Rotary Reciprocating reflector serving as a linear interfacing unit is described. (See FIGS. 2a, 4b and 5b and the specification of the referred patent) The Rotary Reciprocating reflector reciprocates by a similar Rotary Reciprocating mechanism in synchronization with the screen but at a speed of ½ of the speed of the screen. FIG. 15 illustrates such a V3D display system, in side view. It has three major portions: a rotary reciprocating screen unit 1511 (comprising a screen 11 mounted on rotary arms 1522); a high frame rate image projection system 15; and an optical interfacing mechanism 13 (comprising a single reflector 1321 mounted on rotary arms 1322). A stationary reflector 1502 folds the projection path. The set of rotary arms 1322 and the set of rotary arm 1522 rotate synchronously. The figure shows the screen at the top position. When the screen rotates to the bottom position 11A, the interfacing reflector rotates to position 1321A. The projection path is from the projector 15 to the interfacing reflector 1321, then to the folding reflector 1502 and then to the screen. This projection path length is kept constant as the screen and the interfacing reflector rotate. Projection path 402 strikes the interfacing reflector 1321 at an oblique angle, therefore the sides of the resulted display volume 12 are of the shape of parallelogram. The high-frame-rate projector projects a set of 2D image frames onto the moving screen. The moving screen moves and therefore distributes the 2D image frames to corresponding positions in the space swept by the screen. Together, the spatially distributed 2D images form a volumetric 3D image.

All three types of systems, the rotating screen system with an interfacing unit the rotating screen system without an interfacing unit and the Rotary Reciprocating system, comprises rotational mechanisms. If opto-mechanical alignment in the mechanism is perfect and all dimensional tolerance is zero, then the center of projected image frame on the screen always falls on the theoretical position as the mechanism rotates. For the first two types of system, once the center of the projected image frame is aligned to the center of the rotating screen, the two centers always coincide as the screen rotates. That is, the theoretical position of the center of projected image frame on screen is the center of the screen. For the Rotary Reciprocating system, due to the motion of the screen, the theoretical position of the center of the projected image frame on screen is a straight line track falling on one of the center lines of the screen. However, since alignment and dimension of optical and mechanical elements have inevitable error and tolerance, the center of projected image frame on screen can deviate away from the theoretical position as the screen rotates.

A volumetric 3D image is formed by slices of frame images and frame images are first generated by computation based on assumption of ideal mechanism (i.e. no alignment or dimensional error). Therefore, if position error of the center of projected image frame (i.e. deviation with respect to the theoretical position) is not corrected, the volumetric 3D image will appear distorted. It is further noted that "jumping" or "jittering" of displayed volumetric 3D image can occur due to this position error. This is because one screen rotation covers two image volumes (since ½ rotations of the screen sweeps one volume), and the positions of frames relative to the screen in two successive volumes do not coincide due to this position error. The position of a V3D image therefore shifts from one volume to the next.

BRIEF SUMMARY OF THE INVENTION

This invention is to provide means to determine the position error of projected frames caused by opto-mechanical error and means of compensation to correct image error.

This invention is also to devise driving mechanisms that provide minimum error and best suit the methods of compensation In general, this invention comprises three major steps.

The first step is to provide a measure of position error of projected frames. The position error is defined as the actual deviation of the center of projected image frame with respect to the theoretical position. It is a function of different screen locations in the display volume. Due to state of mechanical alignment of the rotational mechanisms used, the position error function is basically a periodical function For the rotating screen system with an interfacing unit, the state of mechanical alignment repeats for very two turns of the screen unit. The position error function therefore basically has a period of two screen rotations (or four volumes). For the rotating screen system without an interfacing unit, the position error function basically has a period of one screen rotation (or two volumes). For the Rotary Reciprocating system, the position error function has a period of one screen rotation (or two volumes).

The position error function can be determined by a method of static measurement or can be represented by V3D images in a dynamic measurement. In the static measurement, the screen unit is turned to different positions step by step and at every position the deviation of the center of projected frame is measured using an overlay placed on the screen. In the dynamic measurement, the measurement is done while the volumetric display system is running at operational speed. A correction scale image is first generated in the display volume, using a display means other than the moving screen. The volumetric display then also displays an imitating image that attempts to reproduce the correction scale image. The deviation of the imitating image with respect to the correction scale image is a measure of the position error function, which can be visualized in the volumetric 3D display.

The second step is to determine a correction function for the projected frames. The correction function is generally the negative of the position error function obtained from the first step, which can be used to compensate the position error. If the position error function was obtained from the static measurement in the first step, then the negative numbers can be obtained. If the dynamic measurement method is used, then the correction function should also be obtained in a dynamic way, that is, while the volumetric display is running at normal speed. An interactive software (or electronic) means needs first to be established to record and adjust the position of a frame image with respect to the frame border for every frame to be projected. A user can then use the software (or electronic) means to adjust the position of each frame independently, while the volumetric display is running. From visualizing the difference between the correction scale image and the imitating image, the user can use the software (or electronic means) to adjust the imitating image and make it coincide the correction scale image. In other words, the correction function is obtained through intuitive trial-and-error based on visualization.

The third step is to compensate the position error of projected frames. Once the correction function is obtained, each frame to be projected should be corrected in position with respect to the screen center according to the correction function. In principle, this is to move a frame image to a direction opposite to the direction of its original error and by the same amount. The preferred method is to shift the frame image (non-blank image content of a frame) with respect to the frame border by software or electronic means. As a result, the position error is cancelled at every frame.

This invention also includes preferred driving mechanisms that return to the same mechanical state periodically. These driving mechanisms keep the periodical nature of frame position error dominated by alignment effect and minimize the effect of form error of gears or belts.

BRIEF DESCRIPTION OF THE DRAWINGS

FIG. 15 illustrates a Rotary Reciprocating system in prior arts.

FIGS. 1a, 2a, 3a, 4a and 5a illustrate the top view of a rotating screen system with an optical interfacing unit, when the screen rotates to different angular positions.

FIGS. 1b, 2b, 3b, 4b and 5b illustrate the relative orientation of the projected image frame with respect to the screen, when the screen rotates to different angular positions, on a rotating screen system with an optical interfacing unit.

FIG. 14a-b illustrates examples of setups used for dynamic error correction, on a rotating screen system, with or without an optical interfacing unit.

FIGS. 16a, 17a, 18a and 19a illustrate the side view of a Rotary Reciprocating system, when the mechanism rotates to different angular positions.

FIGS. 16b, 17b, 18b and 19b illustrate the relative orientation of the projected image frame with respect to the screen, when the mechanism rotates to different angular positions, on a Rotary Reciprocating system.

FIG. 27a-e shows a fourth preferred driving mechanism for a rotating screen system with an optical interfacing unit.

FIG. 24a shows the top view and FIG. 24b shows the side view.

FIG. 25a shows the top view and FIG. 25b shows the side view.

DETAILED DESCRIPTION OF THE INVENTION

1. Rotating Screen Systems, with or without an Optical Rotator as the Interfacing Unit 1.1 Error Analysis FIGS. 1a, 2a, 3a, 4a and 5a illustrate the top view of the rotating screen system of FIG. 13 when the screen 1331 rotates to angular position ($\theta$, measured in reference to a reference position 100) of 0 degree, 90 degree, 180 degree, 270 degree and 360 degree. The image rotator 1320 (marked with a dot 1320a to indicate orientation) rotates at ½ speed of screen and therefore makes ½ turn from FIG. 1a to FIG. 5a. FIGS. 1b, 2b, 3b, 4b and 5b illustrate the relative orientation of the projected image frame 1311 (marked with a dot 1311a to indicate orientation) with respect to the screen, when the screen 1331 rotates to angular position ($\theta$) of 0 degree, 90 degree, 180 degree, 270 degree and 360 degree.

Figure 13:
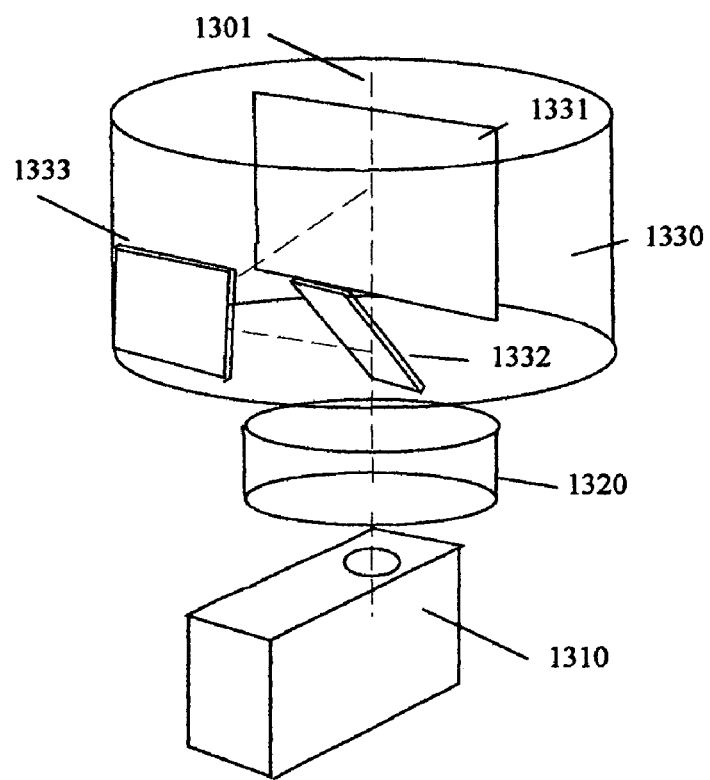
FIG. 13 illustrates a rotating screen system with an optical interfacing unit in prior arts.

FIGS. 6a, 7a, 8a and 9a illustrate the top view of the rotating screen system of FIG. 13 (but without interfacing unit 1320) when the screen 1331 rotates to angular position ($\theta$) of 0 degree, 90 degree, 180 degree, and 270 degree. FIGS. 6b, 7b, 8b and 9b illustrate the relative orientation of the projected image frame 1311 (marked with a dot 1311a to indicate orientation) with respect to the screen, when the screen rotates to angular position ($\theta$) of 0 degree, 90 degree, 180 degree, and 270 degree. Without the interfacing unit, the projected image frame thus rotates with respect to the screen surface as the screen rotates.

Ideally, if alignment is perfect and dimensional tolerance is small enough, then once the center of the projected image frame 1312 is aligned to the center of the screen 103, then the two centers should always coincide as the screen rotates. However, since alignment and dimension of opto-mechanical elements have inevitable error, off-alignment between the two centers can happen as the screen rotates.

Figure 6A:
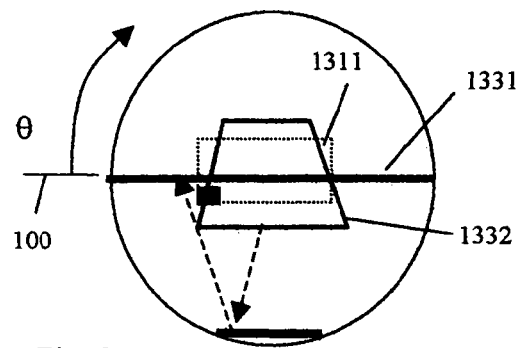
FIGS. 6a, 7a, 8a and 9a illustrate the top view of the rotating screen system without an interfacing unit, when the screen rotates to different angular positions.
Figure 6B:
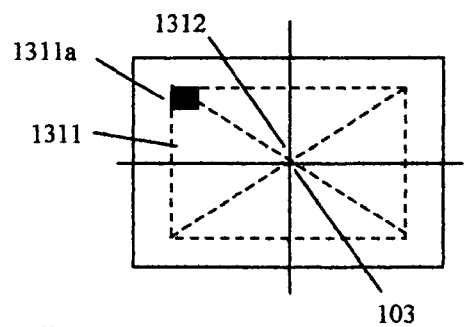
FIGS. 6b, 7b, 8b and 9b illustrate the relative orientation of the projected image frame with respect to the screen, when the screen rotates to different angular positions, on a rotating screen system without an optical interfacing unit.
Figure 7A:
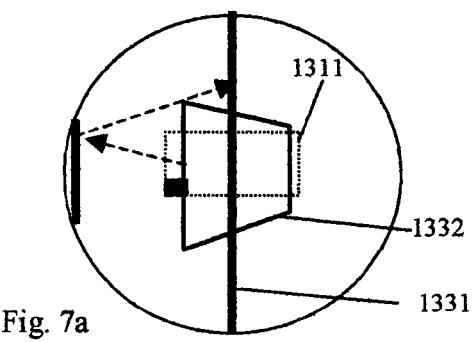
Figure 7B:
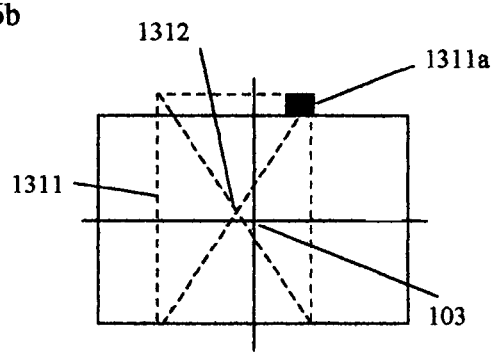
Figure 8A:
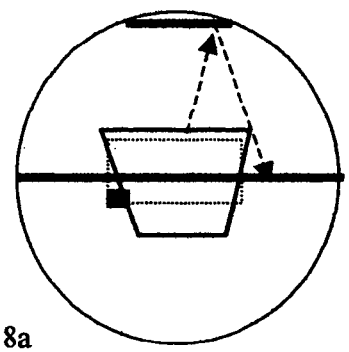
Figure 8B:
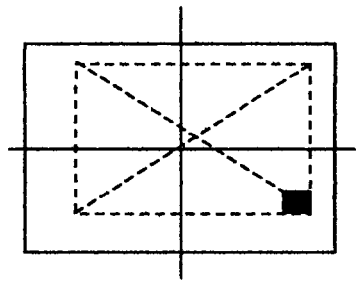
Figure 9A:
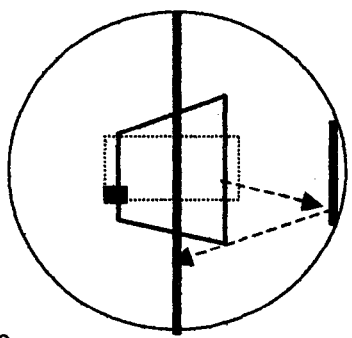
Figure 9B:
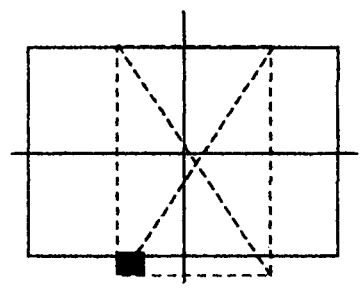
Figure 10:
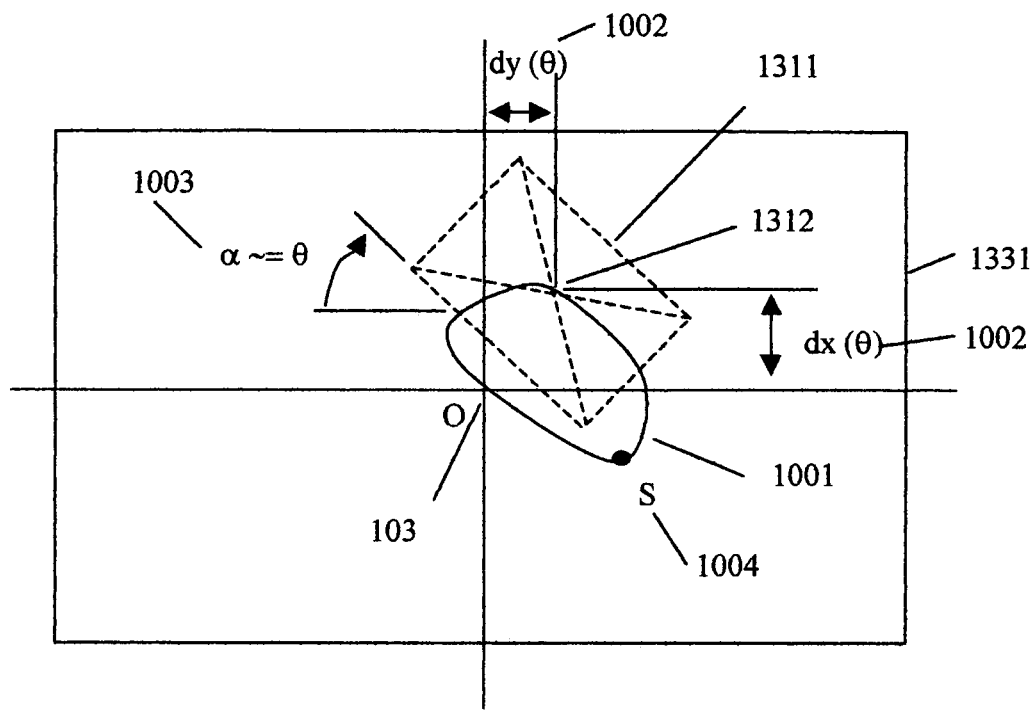
FIG. 10 illustrates an example of track of the center of the projected image frame on the screen on a rotating screen system without an optical interfacing unit.

For a system without an interfacing unit, FIGS. 6b, 7b, 8b and 9b illustrate the position of projected frame (i.e. image of the active area of the image source, i.e. the display panel, of the projector) with respect to the screen (viewed along the projection beam toward the screen surface), when the screen 1331 rotates to angular position ($\theta$) of 0 degree, 90 degree, 180 degree, and 270 degree. Without the interfacing unit, the projected image frame thus rotates with respect to the screen surface as the screen rotates. As indicated at 1003, the angle of rotation $\alpha$ equals $\theta$. If the two centers are aligned to coincide at 0 degree, then they could separate as the screen rotates. The center of the projected frame 1312 could traverse a curved track on the screen surface as the screen rotates, as shown in FIG. 10, 1001. Assuming all parts of the mechanism are properly and definitely constrained, the center of projected image frame 1312 travels back to screen center 103 after the screen rotates one full revolution. This is because the relative position and orientation among the projector unit, its optical paths and the rotating screen unit returns to the exact same state for every screen revolution. That is, the frame center track 1001 is repeatable for every screen revolution. As a result, the position error of the center of the projected image frame (relative to the screen center) as a function of screen angular position ($\theta$=0-360 degree) is periodical and can be determined, as illustrated as $dx(\theta)$ and $dy(\theta)$ in FIG. 10, 1002.

Because a volumetric 3D image is formed by slices of frame images projected onto the screen, if the position error of the center of the projected image frame (relative to the screen center) is not corrected, the volumetric 3D image will appear distorted. It is further noted that "jumping" or "jittering" of displayed volumetric 3D image can occur because one screen revolution covers two image volumes (½ revolution of the screen sweeps one volume). For example, when the screen rotates from 0 degree to 180 degree, it sweeps a 1st volume and the corresponding frame center track traverses the upper part of curve 1001 from O to S (1004), as shown in FIG. 10. When, the screen rotates from 180 degree back to 0 degree, it sweeps a 2nd volume and the corresponding frame center track traverses the lower part of curve 1001 from S to O. The image frame center traverses different tracks during the two successive volumes because the relative position among the projector unit, its optical paths, and the screen unit returns to the exact same state only every two volumes. As a result, if the position error of the center of projected image frame (relative to the screen center) is not corrected, a still volumetric 3D image will appear "jumping" from one volume to the next.

Figure 11:
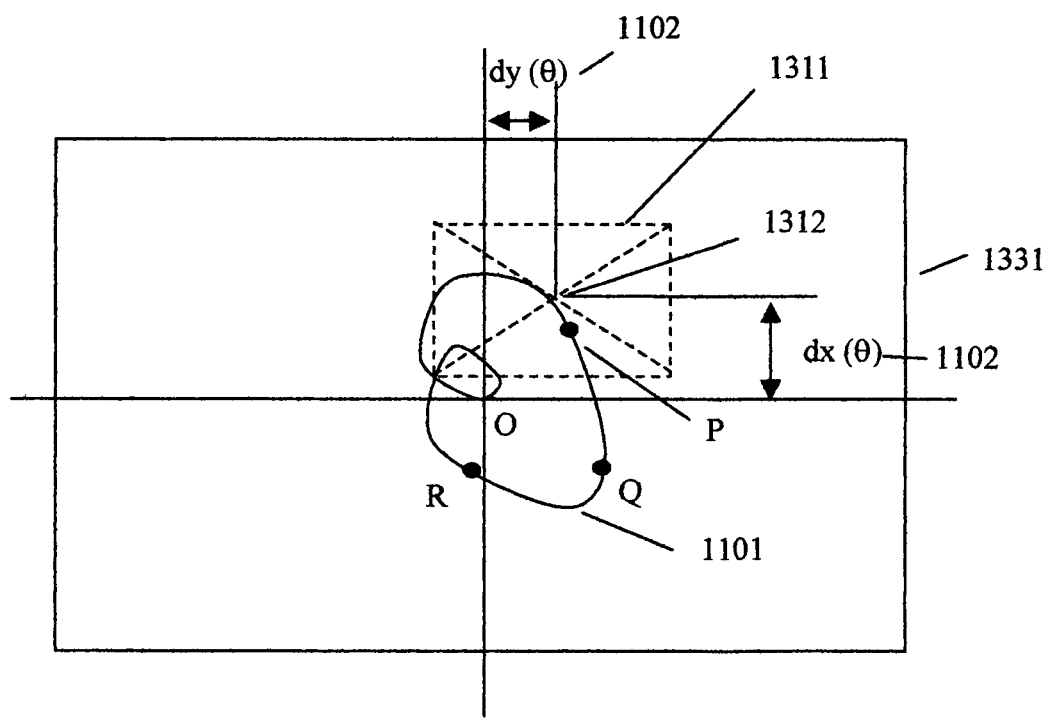
FIG. 11 illustrates an example of track of the center of the projected image frame on the screen on a rotating screen system with an optical interfacing unit.
Figure 12:
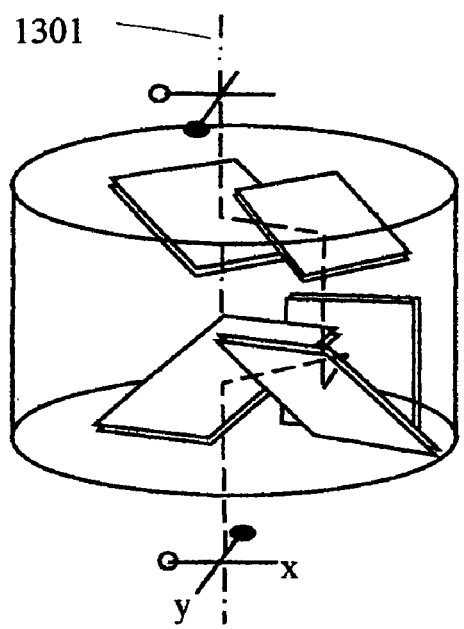
FIG. 12 illustrates an example of optical interfacing unit for a rotating screen system in prior arts.

For example of a system with an interfacing unit, FIGS. 1b, 2b, 3b, 4b and 5b illustrate the position of projected frame with respect to the screen, when the screen 1331 rotates to angular position ($\theta$) of 0 degree, 90 degree, 180 degree, 270 degree and 360 degree. Because of the use of an interfacing unit, the projected image frame does not rotate with respect to the screen surface. If the two centers are aligned to coincide at 0 degree, then they could separate as the screen rotates. Again, the center of the projected frame 1312 could traverse a curve track on the screen surface as the screen rotates, as shown in FIG. 11, 1101. However, because of the use of the interfacing unit 1320 that rotates at ½ speed of the screen, the relative position and orientation among the projector unit, its optical paths, the interfacing unit, and the screen unit returns to the exact same state as FIG. 1a only when the interfacing unit rotates every one revolution. That is, the center of projected image frame travels back to screen center 103 and the frame center track 1101 repeats itself for every two revolutions of the screen. The position error of the center of the projected image frame (relative to the screen center) as a function of screen angular position ($\theta$=0-720 degree) is also periodical and can be determined, as illustrated as dx($\theta$) and dy($\theta$) in FIG. 11, 1102. For example, when the screen rotates from 0 degree to 180 degree, it sweeps a 1st volume and the corresponding frame center track traverses the upper part of curve 1101 from O to P. When, the screen rotates from 180 degree back to 360 degree, it sweeps a 2nd volume and the corresponding frame center track traverses from P to Q. Similarly, the 3rd-volume corresponds to 360-540 degree and Q to R; and the 4th volume 540-720 degree and R to O. The image frame center traverses different tracks during the four successive volumes because the relative position among all mechanical components and optical paths returns to the exact same state only every four volumes.

In general, position error of the center of projected frame, dx($\theta$) and dy($\theta$), comes from mis-alignment between the projector unit and the rotating components, i.e. the screen unit and the interfacing unit, if used. In addition, there can be a rotational error of the orientation of the projected image frame, i.e. error of angle $\alpha$. This error, d$\alpha$($\theta$), is mainly due to angular position error of the rotating components. Section 3 has more discussions on this error.

The above analyzes the cause of the problem.

1.2 Correction Schemes

The first method to correct the volumetric 3D image distortion and "jumping" caused by the position error of projected frame center comprises the following steps:

(1) Determine the error function of the center position of the projected image frame with respect to the center of the screen. The error (dx, dy) is a function of screen angular position ($\theta$):

$$(dx, dy) = (fdx(\theta), fdy(\theta))$$

$\theta$=0-360 degree for systems without an interfacing unit;
$\theta$=0-720 degree for systems with an interfacing unit;

One typical method to measure the error function is to place an overlay with dimensional scales and a marking of the screen center over the screen surface. The projector then projects an alignment image pattern marked with the frame center position, such as the one illustrated by dash lines in FIG. 1b, 1311 to the overlay. Then turn the mechanism step by step in small angular steps while measuring the deviation of the frame center away from the screen center at each angular step. A list of position error can therefore be established. Measurement needs not to be made at every angular step. Measurement can be done at selected angular steps and interpolation can be applied to obtain errors at other angular positions. However, measurement or interpolation should cover one full period. That is, 360 degree of screen rotation for rotating screen systems without an interfacing unit; and 720 degree of screen rotation for systems with an interfacing unit.

(2) Determine a correction of the position of frame image (i.e. non-blank image content in a frame) to be projected. The correction is a position shift measured with respect to border of the frame (or equivalently, center of the frame). The correction (dx, dy)c is a function of screen angular position and is:

$$(dx, dy)c = (-fdx(\theta), -fdy(\theta))$$

Figure 28:
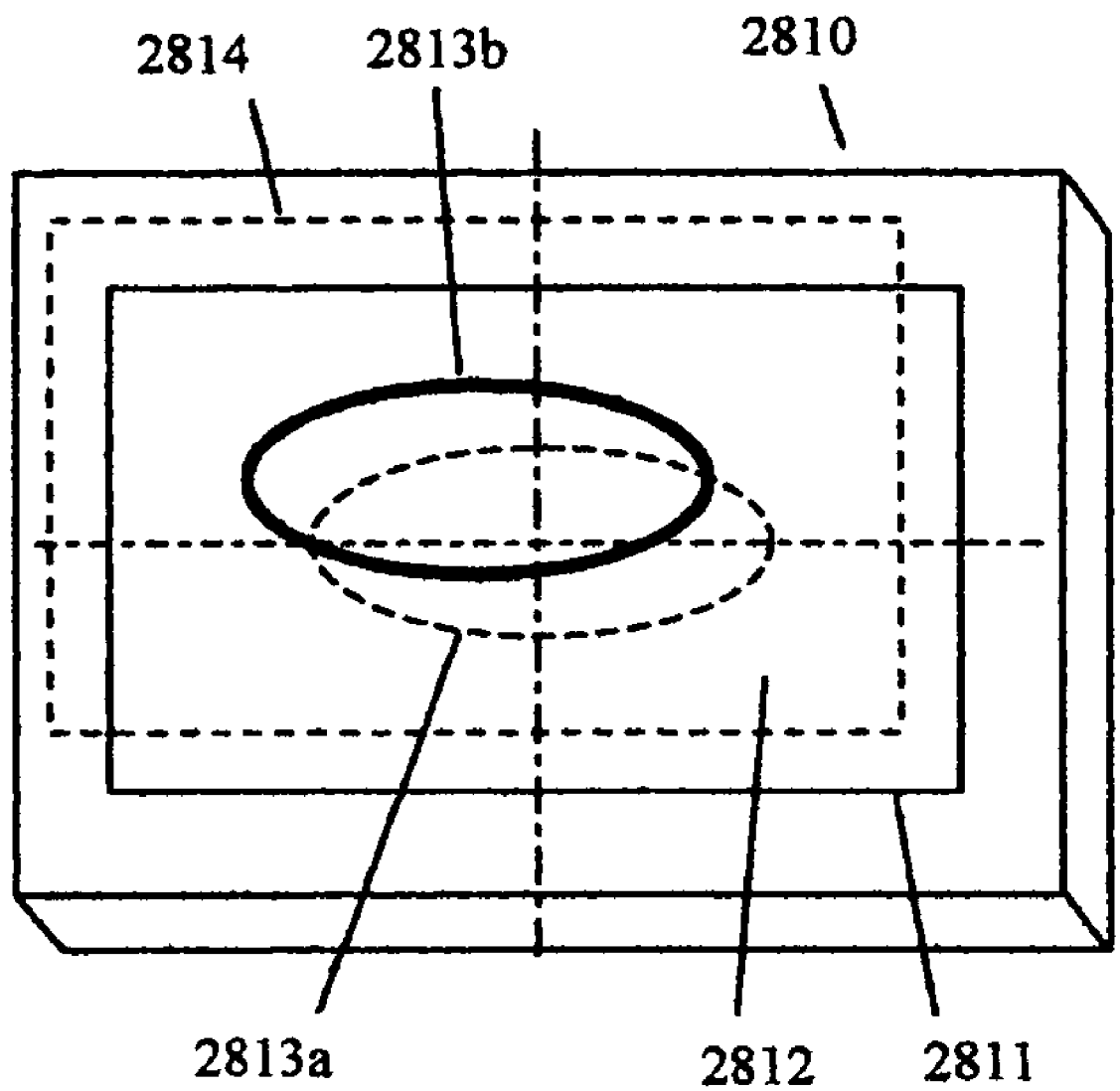
FIG. 28 illustrates the shifting of a frame image with respect to the frame border.

$\theta$=0-360 degree for systems without an interfacing unit,
$\theta$=0-720 degree for systems with an interfacing unit;

(3) Adjust the position of each frame to be projected with respect to the screen center according to the correction function obtained in step (2). In principle, this is to move a frame image to a direction opposite to the direction of its original error and by the same amount. As a result, the position error is cancelled at every frame. The preferred method is to shift the frame image (i.e. non-blank image content in a frame) with respect to the border of the frame. For example, as shown in FIG. 28, if a display panel 2810 is used in the high frame rate projector 1310, then this is basically to shift the frame image with respect to the border 2811 of active area 2812 of the display panel, from position 2813a to 2813b. In effect, the frame border is shifted to position 2814. For convenience, the position error function should be measured in terms of number of pixels on screen, in step (1). This way, the shift correction on the display panel can also be based on number of pixels. In practice, a list of shift amount for every frame, according to the correction function, is stored in the computer of the volumetric display. The software for generating frame images takes the list and shifts the frame image accordingly. Alternatively, the shift can also be performed by electronics when the image data is being loaded into the memory buffer of the display panel. These details of practice in software or electronics should be known to people skilled in the arts, and hereby are not discussed further.

The second method corrects the position error dynamically, i.e. while the volumetric 3D display is operating and the screen is rotating at operating speed, without advance knowledge of the position error function from static measurement of the first method. This method comprising the following features:

(1) An interactive software (or electronic) means is first established to be able to record and adjust the position of a frame image with respect to the frame border at every corresponding angular position of the screen independently.

(2) Provide a well-defined and known geometric image as correction scale in the display space of the volumetric 3D display. This correction scale image should be generated by means other than projection of the projector of the V3D display. One example is to shoot one or more laser beams into the display space of rotating screen to form one or more straight lines. As illustrated in FIG. 14a, three laser beams 1460 can form a triangle in the display space. By properly position the laser beams, the exact position and dimension of the triangle 1461, with respect to the common axis and the screen center, can be determined. Another example is to attach a small light emitting diode (LED) 1470 to a fixed position in the screen unit (does not have to be on the screen), using an attachment structure 1472. As in FIG. 14b, the LED will form a perfect circle 1471 as the screen unit rotates. The exact position and diameter of the circle, with respect to the common axis and the screen center, can also be determined.

(3) Take the geometric data and position information of the correction scale image of (2) and process it into a set of frame images and then display it in the volumetric 3D display. This V3D image is called an imitating image. If the V3D display has no alignment or opto-mechanical error, then the imitating image (either a triangle or a circle, for example) will coincide the correction scale image. But since the opto-mechanical error is inevitable, the projected geometric image and the correction scale image will therefore not coincide. The deviation of the projected image away from the correction scale image can be observed fully and directly in volumetric 3D. For a V3D display without an interfacing unit, one will see two different projected images, each corresponding to one of two successive volume sweeps. For a V3D display using an interfacing unit, there could be up to four different projected geometric images, each corresponding to one of four successive volume-sweeps.

(4) Use the interactive software (or electronic) means established in feature (1) to adjust the position of each of the frame images with respect to the frame border and thereby move and reshape the projected imitating image (i.e. the triangle or circle) to coincide the correction scale image. Once all projected images and the correction scale image coincide, the position error is corrected. The adjustment is recorded and then can be applied on this V3D display to display all other images. It is noted that the software means can further comprise an interpolation scheme such that a user does not have to manually enter the adjustment amount of each frame image. The interpolation scheme can allow the user to make manual adjustment entry at selected angular positions and interpolate all the rest adjustments. In addition, the software means can also allow the user to turn off the frame images at selected angular positions so that only a part of the imitating image is displayed at a time for easy visualization.

Finally, it is noted that the above methods can also be applied to correct any possible rotational error, $d\alpha(\theta)$, not limited to translation errors (dx or dy), as long as an additional adjustment to rotate the frame image with respect to the image frame is provided.

2. Rotary Reciprocating Systems

2.1 Error Analysis

FIGS. 16a, 17a, 18a and 19a illustrate the system of FIG. 15 when the screen 11 rotates to angular position ($\theta$) of 0 degree, 90 degree, 180 degree, and 270 degree. The interfacing reflector 1321 rotates synchronously. FIGS. 16b, 17b, 18b and 19b illustrate the relative position of the projected image frame 1201 with respect to the screen (viewed from top) by example.

Figure 20:
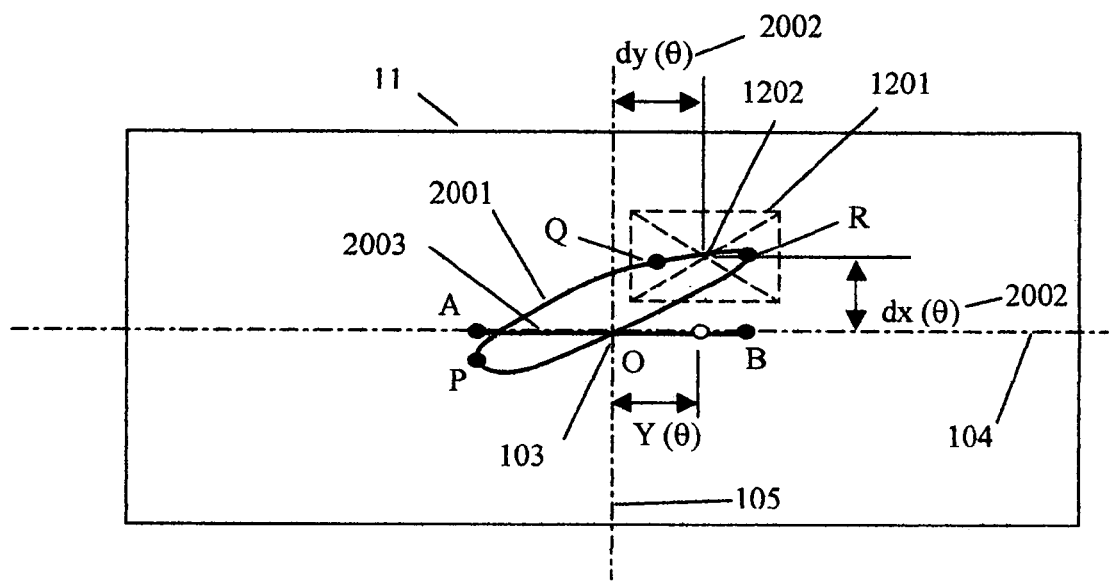
FIG. 20 illustrates an example of track of the center of the projected image frame on the screen on a Rotary Reciprocating system.

Ideally, if alignment is perfect and dimensional tolerance is small enough, and assuming the center of the projected image frame 1202 is aligned to the center of the screen 103 when the screen is at top position, then the frame center 1202 should travel back and forth precisely along screen centerline 104 as the system rotates. As shown in FIG. 20, the frame center moves on straight line 2003 from point O to A and then back to O and then to B and then back to O.

However, since alignment and dimensional error is inevitable, frame center 1202 could travel off the screen centerline. For example, the center of the projected frame 1202 could traverse a curved track on the screen surface as the screen rotates, as shown in FIG. 20, 2001. Assuming all parts of the mechanism are properly and definitely constrained, it is noted that the center of projected image frame 1202 travels back to screen center 103 when the screen rotates every one full revolution. This is because the state of alignment among the screen unit, the interfacing reflector and the optical paths returns to the exact same state every one screen rotation. That is, the frame center track 2001 is repeatable for every screen rotation. As a result, the position error of the center of the projected image frame (relative to the screen center) as a function of screen angular position ($\theta$=0-360 degree) is periodical and can be determined, as illustrated as dx($\theta$) and dy($\theta$) in FIG. 20, 2002.

For example, when the screen rotates from 0 degree to 180 degree, it sweeps a first volume and the corresponding frame center track traverses the lower part of curve 2001 from 0 to P to Q. When, the screen rotates from 180 degree back to 360 degree, it sweeps a second volume and the corresponding frame center track traverses from Q to R and back to O. The image frame center traverses different tracks during the two successive volumes because the state of alignment between the screen unit, the interfacing reflector and the optical paths returns to the exact same state every two volumes (one revolution).

2.2 Correction Schemes

Figure 21A:
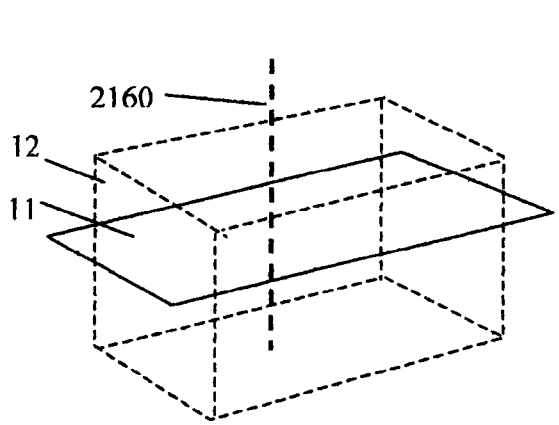
FIG. 21a-b illustrates examples of setups used for dynamic error correction, on a Rotary Reciprocating system.
Figure 21B:
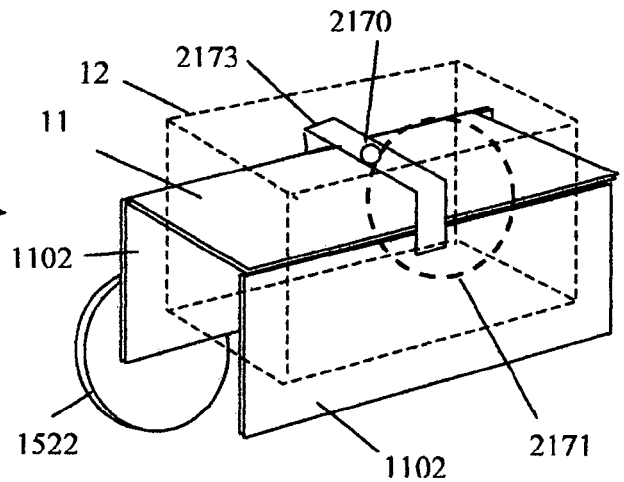

The two correction schemes described in Sec. 1 for volumetric 3D displays based on revolving screen can also be applied to the current case. In scheme 1, however, it should be noted that the position error function dy($\theta$) includes the lateral component of the screen displacement. That is, assuming there is no position error, the center of the projected frame 1202 still travels along screen centerline 104 and a displacement function Y($\theta$) can be calculated, which describes line 2003. To obtain the correction function of the frame center (dx, dy)c, this geometry-caused displacement should be deducted from dy($\theta$). That is, Measured center position error $(dx,dy)=(fdx(\theta),fdy(\theta))$ Correction of frame center $(dx,dy)c=(-fdx(\theta),-fdy(\theta)+Y(\theta))$ $\theta$=0-360 degree In scheme 2, the correction scale images can still be generated by setups similar to those described in Sec. 1. For example, FIG. 21a illustrates shooting one laser beam 2160 into the display space to form one straight line as the correction scale image. For another example, FIG. 21b illustrates attaching a small light emitting diode (LED) 2170 to a fixed position in the screen unit. The LED can be mounted to a bracket 2173 attached to the supporting structure 1102 of the screen, and does not have to be on the screen. As in FIG. 21b, the LED will form a perfect circle as the screen unit rotates. The exact position and diameter of the circle, with respect to the common axis and the screen center, can also be determined.

3. Preferred Driving Mechanisms

In previous sections, the effect of state of alignment among projector unit, interfacing unit (if used) and screen unit is analyzed to show that the position error of image frame on the screen is periodical and can be measured and corrected. This assumes that different moving components, such as rotating screen and rotating image rotator, do follow their designed motion and speeds precisely. The effect of driving mechanisms was not discussed. If significant error presents in the driving mechanism, then additional error can appear. Therefore, the driving mechanism must be made to keep the periodical nature dominated by the alignment effect and be made to have minimum error.

3.1 For Rotating Screen Systems

For a volumetric 3D display without an interfacing unit, there is only one rotating component, the unit that carries the screen and the optics on it. The only factor that could affect the state of opto-mechanical alignment is the form error of the driving belt or gear connecting the rotating screen unit and the driving motor. In order to exclude the effect of form errors of gears or belts, the position of the rotating unit should be tracked directly, e.g. by placing an encoder on the rotating unit, instead of tracking from the motor. In general, this principle is also true for other type of moving screen systems, that is, it is preferred to track the position of rotating unit or interfacing unit directly, instead of tracking via other components in the mechanism.

For a volumetric 3D display with an interfacing unit, a simple and usual approach to maintain the position and speed relation between the screen unit and the interfacing unit is to couple the two units with timing belts and/or gears. In doing so, the factor of belt/gear form error could affect the precise position of the interfacing unit with respect to the screen unit. The major concern is this: referring to FIG. 1a-5a, after the image rotator rotates 1 turn and the screen rotates 2 turns, do both components really return to the same initial position? Could the form error or gears or belts actually introduce significant position errors? The position error, if any, must not be too significant to affect the previously described correction schemes.

In general, the driving mechanism should also have a periodical nature. That is, all moving components, such as gears or belts, should be able to return to the exact same state periodically. The driving mechanism period should match or be integer multiples of the period of the position error function described in previous sections. This way, the effect of mechanical form error can be included into the position error function and be corrected by methods described previously.

Figure 22:
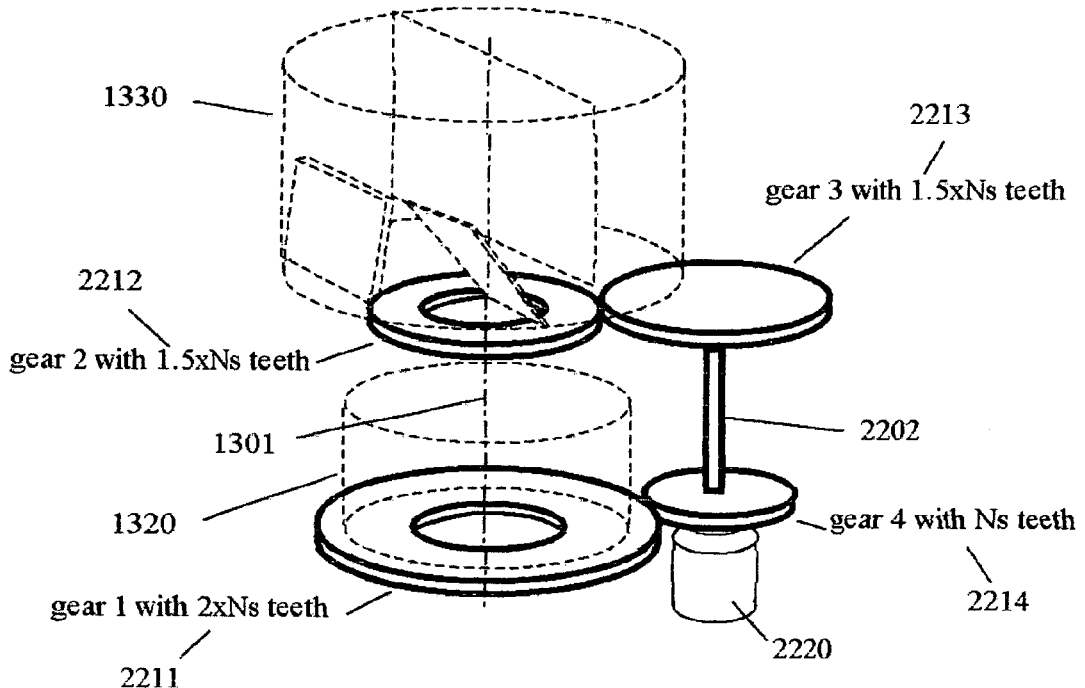
FIG. 22 shows a first preferred driving mechanism for a rotating screen system with an optical interfacing unit.

FIG. 22 shows a gear mechanism that provides the required 1:2 speed ratio for image rotator vs. screen and also guarantees to return to the same state after one turn of the image rotator. Gear 3 (2213) drives gear 2 (2212), which is attached to the screen unit 1330. Gear 4 (2214) drives gear 1 (2211), which is attached to the interfacing unit 1320. Gear 4 has Ns teeth. Gear 3 and gear 2 each has 1.5×Ns teeth. Gear 1 has 2×Ns teeth. The gear ratios provide the required 1:2 speed ratio for the interfacing unit 1320 vs. the screen unit 1330. With the gear ratios, the screen unit and the interfacing can be aligned co-axially 1301, and gear 4 and gear 3 can also be aligned co-axially and driven from one common axis 2202 and one motor 2220. When the interfacing unit 1320 rotates one turn the screen unit 1330 rotates two turns and all gears return to initial positions. That is, after every one turn of gear 1, the exact same teeth on gear 1 and gear 4 will touch. So do the teeth on gear 2 and 3. The driving mechanism therefore returns to the exact same mechanical state for every one turn of the interfacing unit.

The gear ratio described above is just an example. To generalize the case of gear driving mechanism, gears should satisfy the following conditions:

$$2\times(\text{Teeth number of gear 2/Teeth number of gear 3})= \\ (\text{Teeth number of gear 1/Teeth number of gear 4}); \quad (1)$$

$$(\text{Teeth number of gear 2/Teeth number of gear 3})=\text{an integer; and (Teeth number of gear 1/Teeth number of gear 4)=an integer;} \quad (2)$$

$$\text{Teeth number of gear 2+Teeth number of gear 3=Teeth number of gear 1+Teeth number of gear 4.} \quad (3)$$

The first condition provides the 2:1 speed ratio of screen unit vs. interfacing unit. The second condition makes the mechanism return to the exact same state after an integer number of rotations of the screen unit. The third condition makes the common axis 1301 parallel to the common driving shaft 2202.

Figure 23:
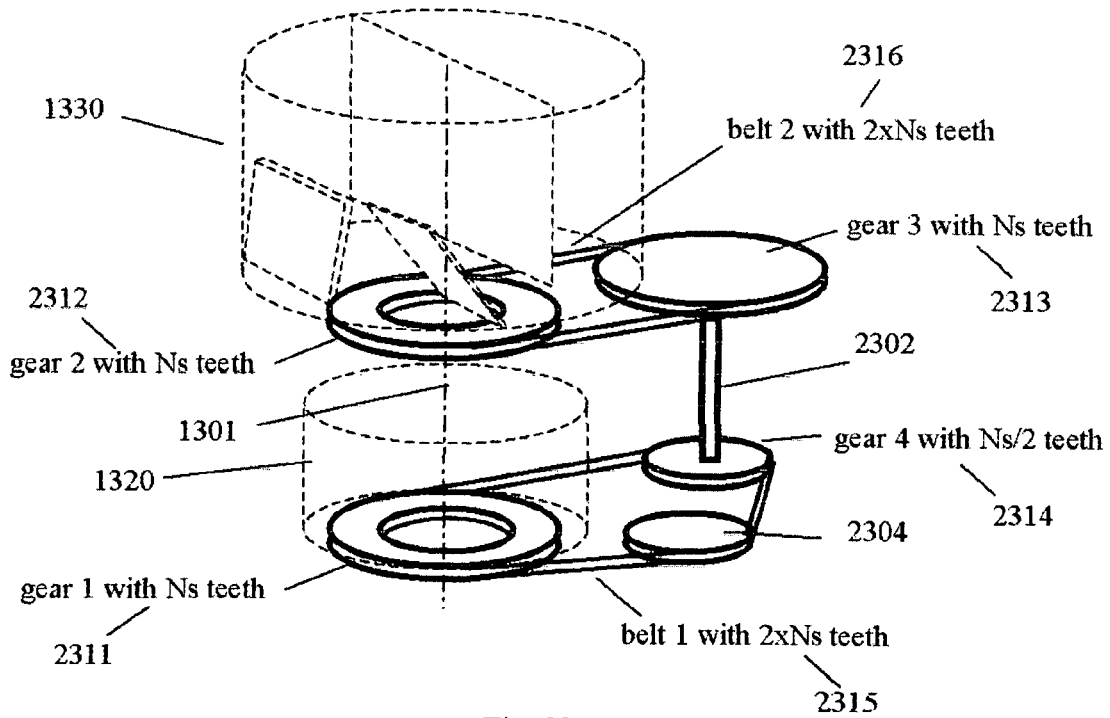
FIG. 23 shows a second preferred driving mechanism for a rotating screen system with an optical interfacing unit.

FIG. 23 shows a gear-timing-belt mechanism that returns to the initial state periodically. This mechanism returns to the exactly same state every two turns of the interfacing unit. This mechanism also has four gears 2311-2314 as the main driving gears but the gears are engaged by two timing belts 2315-2316. Gear 3 (2313) drives gear 2 (2312), which is attached to the screen unit 1330, via timing belt 2 (2316). Gear 3 and gear 2 each has Ns teeth and timing belt 2 has 2×Ns teeth. As a result, the gear-belt system returns to the same state after every two turns of gear 2. Gear 4 (2314) drives gear 1 (2311), which is attached to the interfacing unit 1320, via timing belt 1 (2315). Gear 4 has Ns/2 teeth Gear 1 has Ns teeth. Timing belt 1 has 2×Ns teeth. Gear 4 and gear 3 are driven via a common shaft 2302. An idler gear 2304 tightens belt 1. As a result, for every two turns of the screen unit, the interfacing unit rotates one turn, providing the required 2:1 speed ratio. For every four turns of the screen unit, the interfacing unit rotates two turns and belt 1 travels 2×Ns teeth, i.e. one cycle of the belt, thus the system returns to initial state. That is, only after two turns of the interfacing unit (gear 1), the same teeth on gear 1 re-touches the same position on belt 1.

Again, the gear & belt teeth ratio described above is just an example. To generalize the case, gears and timing belts should satisfy the following conditions:

$$2\times(\text{Teeth number of gear 2/Teeth number of gear 3})= \\ (\text{Teeth number of gear 1/Teeth number of gear 4}); \quad (1)$$

$$(\text{Teeth number of belt 2/Teeth number of gear 2})= \\ (\text{Teeth number of belt 1/Teeth number of gear 1})=\text{an integer; and (Teeth number of belt 2/Teeth number of gear 3)=an integer.} \quad (2)$$

The first condition provides the 2:1 speed ratio of screen unit vs. interfacing unit. The second condition makes the mechanism return to the exact same state after an integer number of rotations of the screen unit.

If the mechanism of FIG. 23 is used, then the previously described correction scheme should use a period of four screen turns, instead of two. However, if the form error is not significant, correction schemes using a period of two turns may still be good enough. In general, the effect of any form error is to result in a slight angular position error between the image rotator 1320 and the screen 1330. The resulted error to images on the screen is therefore also a slight angular position error measured about the center of projection. Therefore, the image error is proportional to the distance from the projection center (usually the screen center). Error is zero near the center, is small in the central region of the display volume, and is maximum at the outmost region. One can estimate this image error from the gear-belt form error and compare it to the pixel size of projected image to determine if the error is significant enough, and then design the correction scheme accordingly.

For example, the rotational error (angular error) of projected image due to timing belt form error is:

$$d\alpha = 2de/R'$$

where de is form error of timing gear-belt, R' is radius of the gear driving the image rotator (gear 1, 2311 of FIG. 23). The factor 2 comes from reflection by the image rotator. The maximum displacement error of projected image is therefore $$d\max = R \times d\alpha = 2Rde/R'$$

where R is radius of the display volume. Assuming the projected image frame has a width of M pixels, then the size of one pixel on screen is $$D\text{pixel} = 2R/M.$$

Comparing dmax with pixel size:

$$d\max/D\text{pixel} = Mde/W$$

With a typical value of de 0.005" and assuming R' as 2" and M as 1000, dmax is roughly 2.5 pixels, which means dα generally causes very small image error.

If the interfacing unit is a single reflector (case of FIG. 10 of Tsao et al. U.S. Pat. No. 5,754,147), and if the form error is significant, then the gear mechanism of FIG. 22 is preferred. This type of interfacing unit could result in position error of the whole frame, if the form error is significant.

Another approach is to drive the screen unit and the interfacing unit by separate motors while maintaining required speed ratio and phase relation via a control link In the common shaft driving mechanisms, such as FIG. 22 and FIG. 23, the mechanisms can at the same time set both speed ratio and relative position between the screen unit and the interfacing unit. In the case of driving by separate motors, although speed control of motors is a well-developed art, the control link must also monitor the relative position of the two rotating units in order to control the motors to maintain both the required speed ratio and the phase relation.

In general, there are two types of approaches for monitoring and maintaining the relative position between the screen unit and the interfacing unit. The first type of approach is to measure the phase error between angle traveled by the screen unit and twice the angle traveled by the interfacing unit within one screen rotation, and then apply a control signal proportional to the phase error to correct the speed of one of the two motors. This generally involves applying a first sensor or monitoring means to obtain a measured signal proportional to angle traveled by the screen unit within a period of time, and a second sensor/monitoring means to obtain a signal proportional to twice the angle traveled the interfacing unit within the same period of time. The two signals are then compared to obtain their difference, which represents the phase error of the relative position between the screen unit and the interfacing unit. A control signal proportional to the difference is then generated to correct the speed of one of the motors, in a feedback control system. At steady state, the phase error is minimized and both the speed ratio and the relative position requirements are satisfied.

Figure 26A:
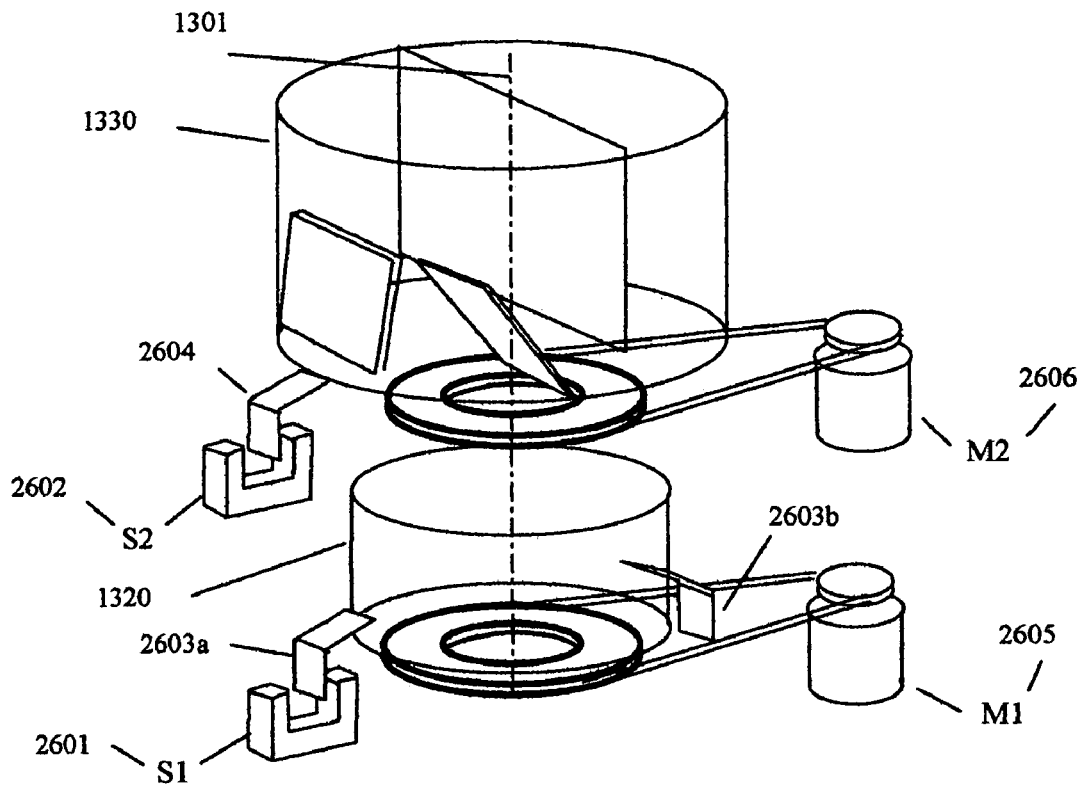
FIG. 26a-b shows a third preferred driving mechanism for a rotating screen system with an optical interfacing unit.
Figure 26B:
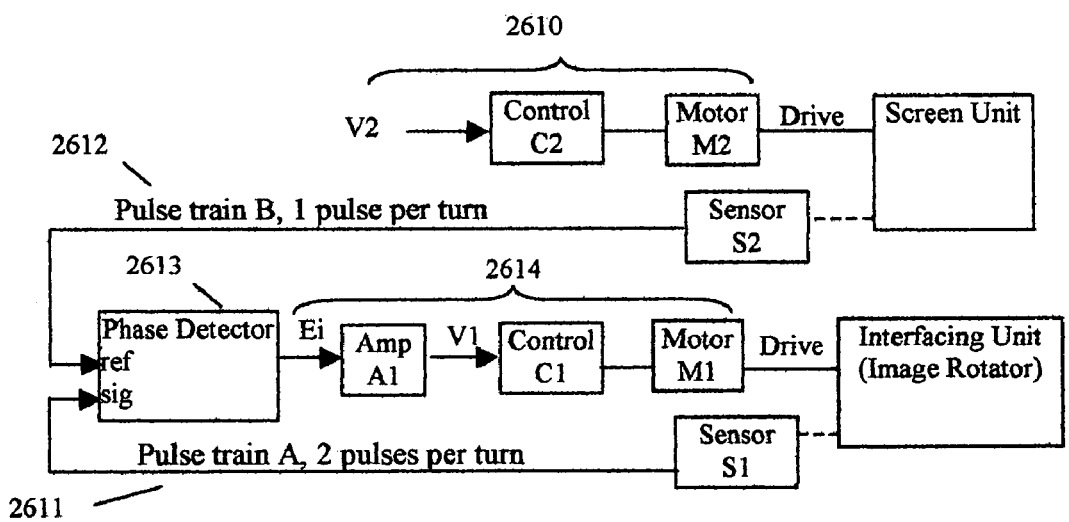

FIGS. 26a & 26b shows one example of the first approach. Separate motors (2605 and 2606) drive the rotating screen unit and the optical interfacing unit. This example measures the phase difference between two signal pulse trains, one from the screen unit and one from the interfacing unit, to generate control signals. An optical sensor S2 (2602) and a shutter 2604, attached to the rotating screen unit, create signal pulse train B (2612) for the screen unit 1330. Pulse train B has one pulse per screen rotation. A second optical sensor (2601) and another two shutters (2603a and 2603b) create pulse train A (2611) for the interfacing unit 1320. The two shutters 2603a & 2603b are attached to the rotating interfacing unit with 180 degrees phase difference between them. Pulse train A therefore has two pulses per rotation of interfacing unit. The screen unit is driven at a constant speed by motor M2, which has a pre-set control voltage V2, as shown 2610. A phase detector 2613, preferably an edge-sensitive lead-lag phase detector, measures the phase difference between the two pulse trains. The output voltage Ei of the phase detector is then used to generate control voltage V1 for motor M1. Pulse train B from the screen unit is used as reference input to the phase detector; pulse train A from the interfacing unit is used as signal input to the phase detector. Therefore, the control block diagram of FIG. 26b is basically similar to a Phase Lock Loop (PLL) system. As a result, at steady state (phase locked), the system will minimize the phase difference between the two pulse trains. At that state, the screen unit and the interfacing unit has an exact 2:1 speed ratio and has the minimum phase error, i.e. minimum relative position error. It is further noted that by using one shutter on the screen unit and two shutters on the interfacing unit, the phase detector is able to measure the phase error between angle traveled by the screen unit and twice the angle traveled by the interfacing unit within one screen rotation. The characteristics of an edge-sensitive lead-lag phase detector as well as the principle of a PLL system are described in The Art of Electronics, 2nd ed, by Horowitz and Hill, pp. 644-645, which is incorporated herein by reference.

The second type of approach makes use of the optical nature of the interfacing unit. In general, this approach comprises the following means:

(1) A projection source generating an optical alignment pattern and projecting the pattern by way of the interfacing unit onto the rotating screen;

(2) A reflector means attached on the screen reflecting the optical alignment pattern back, along the incoming path and by way of said interfacing unit, to an alignment sensor.

(3) The alignment sensor generating an error signal proportional to the degree of rotational alignment error of the optical alignment pattern with respect to the alignment sensor.

(4) A control means generating a control signal proportional to the error signal to correct the speed of one of the two motors, thereby maintaining relative position and speed ratio between the screen unit and the interfacing unit.

FIG. 27a-e shows one example of the second type of approach. Two laser diodes 2702 generate two beams 2703a. When the screen unit 1330 and the interfacing unit 1320 are placed to "zero" position, or to any position with no error in their relative position, the two beams are projected, by way of the interfacing unit, onto the screen unit 2703b. The projection path is basically the same as the projection path for projecting frame images. However, on the screen 1331, two small reflectors 2704 send the beams back along the incoming path toward the laser diodes. A beam splitter 2705 splits the returned beams 2703c onto an alignment sensor 2706. The alignment sensor comprises four brightness sensors arranged into two sensor pairs. Sensors 2706a and 2706d form a pair and sensors 2706c and 2706b form another pair, as shown in FIG. 27b. The output signals of sensors in diagonal positions are summed up, as shown in FIG. 27b, to give two output signals Sa and Sb. The returned laser beams form an alignment pattern of two light spots 2703d Each spot illuminates one sensor pair. When there is no error in the relative position between the screen unit and the interfacing unit, the two spots aligns to the two sensor pairs, as shown in FIG. 27c. Each sensor is illuminated with equal brightness so Sa equals Sb. When relative position error presents, the two-spot light pattern 2703d rotates with respect to the two sensor pairs, as shown in FIG. 27d. As a result, Sa and Sb become unequal. The difference signal can be amplified to correct the speed of one of the motors and then minimize the position error. FIG. 27e illustrates the block diagram of a feedback system.

By using separate driving motors and by monitoring speeds directly from the screen unit and from the interfacing unit, the effect of mechanical form error in the driving components is thereby excluded from the position error of projected image frame.

3.2 For Rotary Reciprocating Systems

For systems based on the rotary reciprocating mechanisms, the synchronous rotation can be maintained by gears or by gears and timing belts.

The screen unit (1511 of FIG. 15) and the interfacing unit 13 can also be driven by separate motors, as in the case of rotating screen system. For example, optical sensors and shutters similar to the case of FIG. 26a can be used in the case of FIG. 15. One shutter can be attached to one of the rotary arms 1522 for the screen and one shutter can be attached to one of the rotary arms 1322 for the interfacing reflector. A control system similar to that of FIG. 26b can then be used to synchronize the rotation of the two units.

The effect of phase error, whether due to gear or belt form error or due to electronics, is small here. Any phase error results in only small change of the relative distance (optical path) between the interfacing reflector 1321 and the screen 11, which has very limited effect on projected images.

Figure 24A:
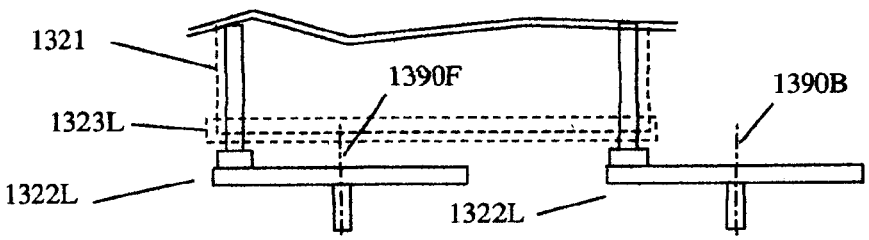
FIG. 24a-b illustrates a Rotary Reciprocating reflector in a Rotary Reciprocating system in prior arts.
Figure 24B:
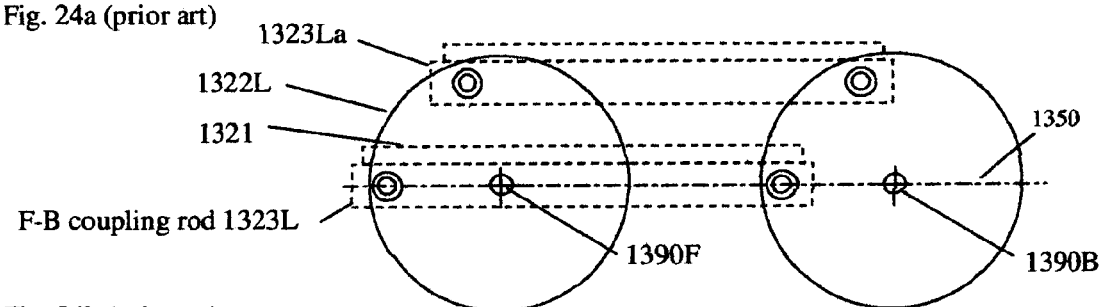
Figure 25A:
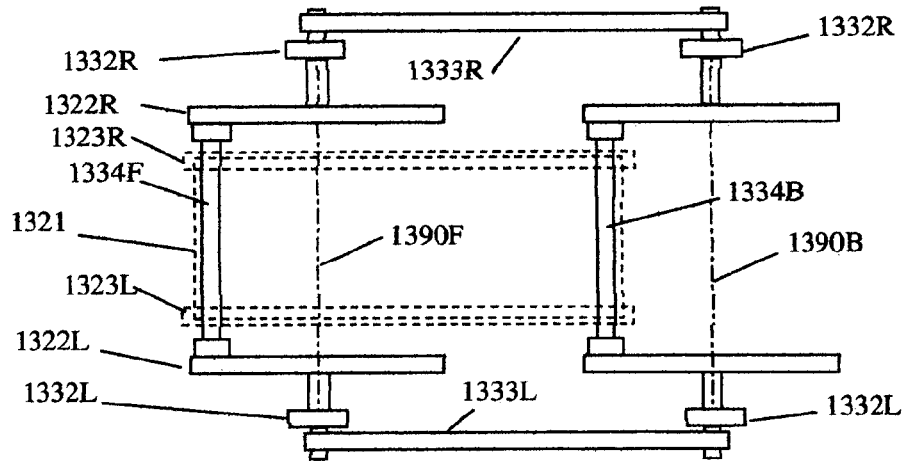
FIG. 25a-b illustrates a preferred mechanism for Rotary Reciprocating reflector in a Rotary Reciprocating system.
Figure 25B:
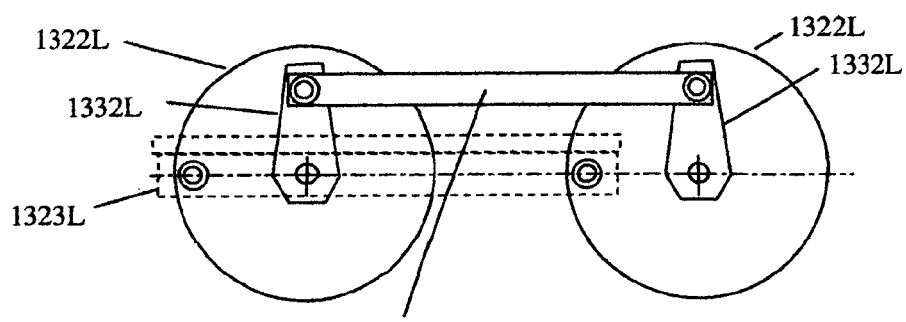

What is more important is the mechanism of the interfacing reflector unit 13. Referring to FIGS. 24a (top view) and 24b (side view), the "rotary reciprocating" mechanism of the interfacing reflector unit basically comprises two cranks on the left side (1322L) and another two cranks on the right side of the reflector assembly 1321. The rotary arms (cranks) 1322L rotate about axes 1390F and 1390B respectively. A left side F-B (front-back) coupling rod 1323L couples the front rotary arm and the back rotary arm 1322L to form a Set of parallel cranks on the left. The right side is the same and is not shown. The reflector assembly 1321 sits on the two F-B coupling rods. When the F-B coupling rods are not near mid plane 1350, as shown at position 1323La, the positions of the two parallel cranks are definite. When the F-B coupling rods rotate to a position very close to mid plane 1350, the positions of the two parallel cranks become indefinite. The front rotary arm and the back rotary arm must therefore be coupled by an additional restraint. If this is the screen unit, the rotary arms can be coupled by gear and timing belt. But the interfacing reflector requires higher precision, because a small angular tilt of the interfacing reflector can result in significant shift of the position where the reflected projection beam strikes on the screen. One preferred approach is adding a second set of rotary arms 1332L (and 1332R) and coupling rods 1333L (and 1333R) at an angle (usually 90 degree with respect to the first set of rotary arms), as shown in FIGS. 25a (top view) and 25b (side view). The position of the parallel cranks on either side will therefore always be definite. This is basically applying a mechanism of parallel cranks cross compound (as called in the art of mechanical mechanisms) on either side. That is, one set of the mechanism of "parallel cranks cross compound" includes two sets of parallel cranks positioned at an angle relative to each other. Referring to FIGS. 25a and 25b, two arms 1322L with rod 1323L are the first set of parallel cranks, and two arms 1332L with rod 1333L are the second set of parallel cranks). In addition, the left side and the right side must also be definitely synchronized. This can be done by connecting the left side arm 1322L and the right side arm 1322R with a L-R (left-right) coupling shaft (1334F) and making the three as a rigid body. The same is done at the back, 1334B. The L-R coupling shafts then also serve as the shafts for the inside parallel cranks, so that the inside F-B coupling rods (1323L and 1323R) ride on them. Thus, with proper alignment, the position and orientation of the reflector 1321 will be repeatable for every one rotation.

4. Concluding Notes

The foregoing discussion should be understood as illustrative and should not be considered to be limiting in any sense.

For example, the embodiment described in FIGS. 26a-b can also use a sensor system that outputs a voltage proportional to angle traveled by the screen unit, instead of pulse signal. A proximity sensor with properly shaped sensing surface on the screen unit is one example setup. For another example, the embodiment described in FIGS. 27a-e can also use a projected pattern for alignment, instead of laser beams. The diode lasers can also be placed on the screen unit and make a one way pass to the stationary detector, instead of two-way pass. For another example, the parallel cranks cross compound mechanism used in FIGS. 25a-b can also be replaced by other coupling mechanisms such as the three parallel cranks and coupling mechanism.

While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

The invention claimed is:

1. Method of projecting images with correction of frame position error for a volumetric 3D display, the volumetric 3D display comprising a moving screen and being one of the following types:
   a. rotating screen system with optical interfacing unit, said moving screen rotating about an axis parallel to and passing through the screen surface, said optical interfacing unit rotating at half the speed of the screen; or
   b. rotating screen system without said optical interfacing unit, said moving screen rotating about an axis parallel to and passing through the screen surface; or
   c. rotary reciprocating system, said moving screen revolving about an axis and sweeping a volume while keeping the screen surface always facing a fixed direction, the system also comprising an interfacing reflector revolving in synchronization with the screen but about a second axis while keeping the reflector surface always facing a fixed direction, the method including the steps of:
   (1) providing a measure of position error of projected image frames, said position error being defined as actual deviation of center of a projected image frame with respect to its theoretical position, said measure of position error being a periodical function of angular position of said moving screen and covering a period of at least
      a. two rotations of said moving screen, if the volumetric 3D display being of the type of said rotating screen system with optical interfacing unit; or
      b. one rotation of said moving screen, if the volumetric 3D display being of the type of said rotating screen system without said optical interfacing unit; or
      c. one rotation of said moving screen, if the volumetric 3D display being of the type of said rotary reciprocating system;
   (2) determining a function of position correction of frame image for each image frame, said frame image being the non-blank image content in a corresponding image frame, said position correction being a position shift of said frame image with respect to center of the corresponding frame, said function of position correction being a periodical function of angular position of said moving screen with a period same as the period of said measure of position error;
   (3) shifting position of said frame image of each frame according to said function of position correction and projecting the corrected frames.

2. Method of claim 1, wherein the step of providing a measure of position error including the steps of:
   (1) attaching an overlay with dimensional scale onto the surface of said screen;
   (2) projecting an alignment pattern marked with center of the image frame onto said screen;
   (3) turning said moving screen step by step and measuring said position error at each step.

3. Method of claim 1, wherein the step of providing a measure of position error including the steps of:
   (1) providing a correction scale image in the display volume of the volumetric 3D display, said correction scale image being well defined and being generated using a display means other than said moving screen;
   (2) displaying an imitating image using the volumetric 3D display, said imitating image being generated according to the definition of said correction scale image, the difference between said imitating image and said correction scale image being a measure of said position error;

and the step of determining a function of position correction including the steps of:
   (1) establishing an interactive software or electronic means capable of recording and adjusting said position shift of frame image with respect to frame center for each projected frames;
   (2) using said interactive software or electronic means to move and reshape said imitating image and make said imitating mage to coincide said correction scale image by adjusting position of frame image of each projected frame;
   (3) recording final adjustment of position of frame image of each projected frame and determining said function of position correction.

4. Method of claim 1, further comprising the step of directly tracking said angular position of said moving screen with a plural encoder on said moving screen.

5. Method of claim 1, wherein the volumetric 3D display comprising a driving mechanism, all moving components in said driving mechanism returning to the exact same state periodically during operation, said driving mechanism having a returning period that equals or is integer multiples of the period of said position error.

6. Method of claim 5, wherein the volumetric 3D display being the type of said rotating screen system with optical interfacing unit, said driving mechanism comprising one of the following means:
   (1) a gear mechanism comprising a first gear of teeth number N1 attached to said interfacing unit, a second gear of teeth number N2 attached to said moving screen, a third gear of teeth number N3 engaging said second gear, a fourth gear of teeth number N4 engaging said first gear, said third gear and said fourth gear both attached to a common shaft, the gears satisfying the following conditions:

$2 \times N2/N3 = N1/N4$, $N2/N3$ = an integer, $N2 + N3 = N1 + N4$;

(2) a timing belt mechanism comprising a first gear of teeth number N1 attached to said interfacing unit, a second gear of teeth number N2 attached to said moving screen, a third gear of teeth number N3 and a fourth gear of teeth number N4 both attached to a common shaft, said fourth gear driving said first gear with a first timing belt of teeth number Nb1, said third gear driving said second gear with a second timing belt of teeth number Nb2, the gears and belts satisfying the following conditions:

$2 \times N2/N3 = N1/N4$, $Nb2/N2 = Nb1/N1$ = a first integer, and $Nb2/N3$ = a second integer.

7. Method of claim 1, wherein the volumetric 3D display being the type of said rotating screen system with optical interfacing unit, the volumetric 3D display comprising:
   a first motor driving said moving screen;
   a second motor driving said interfacing unit;
   a first sensor means to obtain a first signal proportional to angle traveled by said moving screen within a period of time;
   a second sensor means to obtain a second signal proportional to twice the angle traveled by said interfacing unit within the same period of time;
   a control means to generate a control signal proportional to the difference of said first signal and said second signal to correct the speed of one of the two motors and thereby maintaining relative position and speed ratio between said moving screen and said interfacing unit.

8. Method of claim 1, wherein the volumetric 3D display being the type of said rotating screen system with optical interfacing unit, the volumetric 3D display comprising:
   a first motor driving said moving screen;
   a second motor driving said interfacing unit;
   a projection source generating an optical alignment pattern and projecting the pattern by way of said interfacing unit onto said moving screen;
   a reflector means on said moving screen reflecting said optical alignment pattern back, by way of said interfacing unit, to an alignment sensor;
   said alignment sensor generating an error signal representing the degree of rotational alignment error of said optical alignment pattern with respect to the alignment sensor;
   a control means converting said error signal and generating a control signal to correct the speed of one of the two motors and thereby maintaining relative position and speed ratio between said moving screen and said interfacing unit.

9. Method of claim 1, wherein the volumetric 3D display being the type of rotary reciprocating system, the volumetric 3D display comprising:
   a first motor driving said moving screen;
   a second motor driving said interfacing reflector;
   a first sensor means to obtain a first signal proportional to angle traveled by said moving screen within a period of time;
   a second sensor means to obtain a second signal proportional to angle traveled by said interfacing reflector within the same period of time;
   a control means to generate a control signal proportional to the difference of said first signal and said second signal to correct the speed of one of the two motors and thereby maintaining synchronous motion of said moving screen and said interfacing reflector.

10. Method of claim 1, wherein the volumetric 3D display being the type of rotary reciprocating system, said interfacing reflector being driven by a mechanism of rotary arms comprising a coupling mechanism based on parallel cranks cross compound mechanism to maintain a definite and repeatable motion track.

11. Method of claim 10, wherein said coupling mechanism comprising two pairs of parallel cranks cross compound with rigid body coupling between the two pairs.

12. System for displaying volumetric 3D images comprising:
   (1) a screen rotating about an axis parallel to and passing through the surface of said screen;
   (2) an image rotator rotating about said axis at half the speed of said screen;

(3) a driving mechanism driving said screen and said image rotator and maintaining speed ratio and relative position between the two, said driving mechanism comprising one of the following means:

a. a gear mechanism comprising a first gear of teeth number N1 attached to said interfacing unit, a second gear of teeth number N2 attached to said moving screen, a third gear of teeth number N3 engaging said second gear, a fourth gear of teeth number N4 engaging said first gear, said third gear and said fourth gear both attached to a common shaft, the gears satisfying the following conditions:

$2 \times N2/N3 = N1/N4$, $N2/N3$ = an integer, $N2 + N3 = N1 + N4$;

or b. a timing belt mechanism comprising a first gear of teeth number N1 attached to said interfacing unit, a second gear of teeth number N2 attached to said moving screen, a third gear of teeth number N3 and a fourth gear of teeth number N4 both attached to a common shaft, said fourth gear driving said first gear with a first timing belt of teeth number Nb1, said third gear driving said second gear with a second timing belt of teeth number Nb2, the gears and belts satisfying the following conditions:

$2 \times N2/N3 = N1/N4$, $Nb2/N2 = Nb1/N1$ = a first integer, and $Nb2/N3$ = a second integer;

or c. a two-motor mechanism comprising a first motor driving said image rotator, a second motor driving said screen, and a control link monitoring and maintaining relative position and speed ratio between said moving screen and said interfacing unit, said control link comprising one of the following two apparatus:

(i) an angle tracking link comprising:

a first sensor means to obtain a first signal proportional to angle traveled by said screen within a period of time;

a second sensor means to obtain a second signal proportional to twice the angle traveled by said image rotator within the same period of time;

a control means to generate a control signal proportional to the difference of said first signal and said second signal to correct the speed of one of the two motors;

(ii) an alignment tracking link comprising:

a projection source generating an optical alignment pattern and projecting the pattern by way of said image rotator onto said screen;

a reflector means on screen reflecting said optical alignment pattern back, by way of said image rotator, to an alignment sensor;

said alignment sensor generating an error signal representing the degree of rotational alignment error of said optical alignment pattern with respect to the alignment sensor;

a control means converting said error signal and generating a control signal to correct the speed of one of the two motors.

13. System of claim 12, further comprising means for generating correction scale image for dynamic adjustment of frame position error.

14. System for displaying volumetric 3D images comprising:

a screen revolving about an axis while keeping the screen surface always facing a fixed direction, said screen sweeping through space and defining a display volume;

an interfacing reflector revolving in synchronization with said screen but about a second axis while keeping the reflector surface always facing a fixed direction;

an image projector projecting frames of images onto said screen by way of said interfacing reflector;

wherein the improvement comprising:

an improved driving mechanism for driving said interfacing reflector such that the motion track of the interfacing reflector is definite and is repeatable for every rotation, thereby giving a periodical position error with a period of one rotation, and allowing the effect of said periodical error being corrected by a periodical correction of positions of the projected frames of images;

said driving mechanism comprising two pairs of parallel cranks cross compound mechanism, said two pairs of parallel cranks cross compound mechanism comprising a left pair and a right pair, said left pair and right pair being coupled by a rigid body connection, thereby definitely synchronizing the rotations of said left pair and of said right pair;

each said pair of parallel cranks cross compound mechanism comprising:

a first set of rotary arms comprising a front arm and a back arm;

a first front-back coupling rod that couples said front arm and said back arm to form a first set of parallel cranks;

a second set of rotary arms and a second front-back coupling rod that couples said second set of rotary arms to form a second set of parallel cranks, said second set of rotary arms being arranged at an angle relative to said first set of rotary arms;

said rigid body connection comprising a set of left-right coupling shafts, each left-right coupling shaft connecting to one rotary arm of said first set of rotary arms in said left pair and to one rotary arm of said first set of rotary arms in said right pair as a rigid body;

said interfacing reflector riding on said left-right coupling shafts.

15. System of claim 14, further comprising a first motor driving said interfacing reflector, a second motor driving said screen, and a control link monitoring and maintaining synchronous motion of said moving screen and said interfacing unit.

16. System of claim 15, wherein said control link comprising:

a first sensor means to obtain a first signal proportional to angle traveled by said screen within a period of time;

a second sensor means to obtain a second signal proportional to angle traveled by said interfacing reflector within the same period of time;

a control means to generate a control signal proportional to the difference of said first signal and said second signal to correct the speed of one of the two motors.

17. System of claim 14, further comprising means for generating correction scale image for dynamic adjustment of frame position error.

18. Method of projecting images with correction of frame position error for a volumetric 3D display, the volumetric 3D display comprising a moving screen with a rotational mechanism, said rotational mechanism being driven by a driving mechanism, the state of mechanical alignment of the components of said rotational mechanism and said moving screen repeating periodically with a repeating period of a fixed number of rotation of the screen, said driving mechanism returning to the same mechanical state periodically with a period that matches said repeating period or is an integer multiple of said repeating period, the method including the steps of:

(1) providing a measure of position error of projected image frames, said position error being defined as actual deviation of center of a projected image frame with respect to its theoretical position, said measure of position error being a periodical function of angular position of said moving screen and covering a period that matches said repeating period;

(2) determining a function of position correction of frame image for each image frame, said frame image being the non-blank image content in a corresponding image frame, said position correction being a position shift of said frame image with respect to center of the corresponding frame, said function of position correction being a periodical function of angular position of said moving screen with a period same as the period of said measure of position error;

(3) shifting position of said frame image of each frame according to said function of position correction and projecting the corrected frames.

* * * * *